(12) United States Patent
Iwai

(10) Patent No.: US 11,812,348 B2
(45) Date of Patent: Nov. 7, 2023

(54) INFORMATION PROCESSING DEVICE, INFORMATION PROCESSING METHOD, AND INFORMATION PROCESSING SYSTEM

(71) Applicant: SONY CORPORATION, Tokyo (JP)

(72) Inventor: Takuya Iwai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 17 days.

(21) Appl. No.: 16/770,744

(22) PCT Filed: Dec. 6, 2018

(86) PCT No.: PCT/JP2018/044826
§ 371 (c)(1),
(2) Date: Jun. 8, 2020

(87) PCT Pub. No.: WO2019/124086
PCT Pub. Date: Jun. 27, 2019

(65) Prior Publication Data
US 2021/0176609 A1    Jun. 10, 2021

(30) Foreign Application Priority Data
Dec. 20, 2017 (JP) .................................. 2017-243707

(51) Int. Cl.
*H04W 4/38* (2018.01)
*H04W 76/14* (2018.01)
(Continued)

(52) U.S. Cl.
CPC ............. *H04W 4/38* (2018.02); *H04W 76/14* (2018.02); *H04W 80/02* (2013.01); *H04W 84/18* (2013.01)

(58) Field of Classification Search
CPC ......... H04W 4/38; H04W 76/14; H04W 8/00; H04W 80/02; H04W 84/12; H04W 84/18; H04W 4/80; H04W 8/005
See application file for complete search history.

(56) References Cited

U.S. PATENT DOCUMENTS 9,198,225 B2 * 11/2015 Bilcu .................... G08B 25/009
9,729,821 B1 * 8/2017 Fineberg ............... H04W 4/029
(Continued)

FOREIGN PATENT DOCUMENTS

CN      102685922 A     9/2012
CN      104205890 A    12/2014
(Continued)

OTHER PUBLICATIONS

International Search Report and Written Opinion of PCT Application No. PCT/JP2018/044826, dated Feb. 5, 2019, 16 pages of ISRWO.

*Primary Examiner* — Omer S Mian
(74) *Attorney, Agent, or Firm* — CHIP LAW GROUP

(57) ABSTRACT

Provided are an information processing device, an information processing method, and an information processing system capable of easily establishing a link with a plurality of information processing devices. The information processing device includes a generating unit that generates a query, a transmitting unit that transmits the query generated by the generating unit to each of other information processing devices by wireless communication, and a receiving unit that receives processing results based on the query from the other information processing devices by wireless communication. The information processing device further includes a grouping unit that groups the other information processing devices using the processing results received by the receiving unit, in which the information processing device establishes a Layer 2 link with the other information processing devices grouped by the grouping unit.

15 Claims, 13 Drawing Sheets

(51) Int. Cl.
*H04W 80/02* (2009.01)
*H04W 84/18* (2009.01)

(56) References Cited

U.S. PATENT DOCUMENTS

| | | | |
|---|---|---|---|
| 10,007,692 B2* | 6/2018 | Keim | G06F 16/2228 |
| 2003/0163287 A1* | 8/2003 | Vock | A43B 3/0005 |
| | | | 702/187 |
| 2004/0203373 A1 | 10/2004 | Ogino et al. | |
| 2008/0157959 A1* | 7/2008 | Kuris | A61B 5/0002 |
| | | | 340/539.22 |
| 2010/0056174 A1* | 3/2010 | Goldberg | G01S 13/767 |
| | | | 455/456.1 |
| 2012/0230308 A1* | 9/2012 | Saito | H04W 4/023 |
| | | | 370/338 |
| 2013/0123021 A1* | 5/2013 | Stubb | G07F 17/3227 |
| | | | 463/42 |
| 2013/0201876 A1* | 8/2013 | Martin | H04W 84/18 |
| | | | 370/255 |
| 2013/0238619 A1* | 9/2013 | Hanaoka | G06F 16/245 |
| | | | 707/769 |
| 2014/0328262 A1* | 11/2014 | Sampath | H04L 5/0073 |
| | | | 370/329 |
| 2015/0094072 A1 | 4/2015 | Yamaura | |
| 2017/0006435 A1 | 1/2017 | Yamamoto | |
| 2017/0290077 A1* | 10/2017 | Nilsson | G06F 3/0346 |
| 2018/0220417 A1* | 8/2018 | Matsuo | H04W 72/0406 |
| 2019/0063771 A1* | 2/2019 | Cho | F24F 11/58 |

FOREIGN PATENT DOCUMENTS

| | | |
|---|---|---|
| EP | 2838286 A1 | 2/2015 |
| JP | 2004-064615 A | 2/2004 |
| JP | 2009-169888 A | 7/2009 |
| JP | 2016-140088 A | 8/2016 |
| JP | 2017-028434 A | 2/2017 |
| KR | 10-2014-0148402 | 12/2014 |
| WO | 2013/153886 A1 | 10/2013 |
| WO | 2015/174319 A1 | 11/2015 |

* cited by examiner

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2018/044826 filed on Dec. 6, 2018, which claims priority benefit of Japanese Patent Application No. JP 2017-243707 filed in the Japan Patent Office on Dec. 20, 2017. Each of the above-referenced applications is hereby incorporated herein by reference in its entirety.

TECHNICAL FIELD

The present technology relates to an information processing device, an information processing method, an information processing system, and a program, and relates to an information processing device, an information processing method, an information processing system, and a program capable of appropriately detecting, for example, a device which becomes a candidate for a connection destination.

BACKGROUND ART

In recent years, an Internet of things (IoT) technology in which multiple things are connected to the Internet has been proposed. According to the IoT technology, the multiple things are connected to the Internet, and it is thus assumed that a case where a user has to perform connection settings for the multiple things occurs (hereinafter, referred to as wireless devices).

For the connection settings of the wireless devices, there is also a technology called Wi-Fi Protected Set up (registered trademark) of Wi-Fi Alliance, and it has been proposed to connect the wireless devices whose buttons are operated within a certain time to each other when performing connection settings between the wireless devices and an access point.

Furthermore, Patent Document 1 proposes that multiple sensor nodes are connected to each other via a wireless network, data measured by the sensor nodes is collected by a computer, and data analysis is performed.

CITATION LIST

Patent Document

Patent Document 1: Japanese Patent Application Laid-Open No. 2009-169888

SUMMARY OF THE INVENTION

Problems to be Solved by the Invention

According to the Wi-Fi Protected Set up (registered trademark) of Wi-Fi Alliance, the connection settings for the wireless devices can be performed, but when a user wants to connect a plurality of wireless devices to each other, processing such as operating the buttons need to be performed plural times, which is complicated for the user.

Therefore, it is desired that the connection settings for the plurality of wireless devices can be easily performed.

The present technology has been made in view of such a situation, and is to make it possible to easily perform connection settings for a plurality of wireless devices.

Solutions to Problems

A first information processing device according to an aspect of the present technology includes: a generating unit that generates a query; a transmitting unit that transmits the query generated by the generating unit to each of other information processing devices by wireless communication; a receiving unit that receives processing results based on the query from the other information processing devices by wireless communication; and a grouping unit that groups the other information processing devices using the processing results received by the receiving unit, in which the first information processing device establishes a Layer 2 link with the other information processing devices grouped by the grouping unit.

A first information processing method according to an aspect of the present technology, performed by an information processing device, includes: performing generation processing of generating a query; performing transmission processing of transmitting the query generated by the generating processing to each of other information processing devices by wireless communication; performing reception processing of receiving processing results based on the query from the other information processing devices by wireless communication; and performing grouping processing of grouping the other information processing devices using the processing results received by the reception processing, in which the information processing device establishes a Layer 2 link with the other information processing devices grouped by the grouping processing.

A first program according to an aspect of the present technology for causing a computer to function as: a generating unit that generates a query; a transmitting unit that transmits the query generated by the generating unit to each of other information processing devices by wireless communication; a receiving unit that receives processing results based on the query from the other information processing devices by wireless communication; and a grouping unit that groups the other information processing devices using the processing results received by the receiving unit, in which the program includes processing of establishing a Layer 2 link between an information processing device and the other information processing devices grouped by the grouping unit.

A second information processing device according to an aspect of the present technology includes: a sensing unit that acquires environment information by a sensor and generates time-series data; a receiving unit that receives a query from another information processing device by wireless communication; a processing unit that processes the time-series data on the basis of the query received by the receiving unit; and a transmitting unit that transmits a processing result processed by the processing unit to the another information processing device by wireless communication.

A second information processing method according to an aspect of the present technology, performed by an information processing device, includes: performing sensing processing of acquiring environment information by a sensor and generating time-series data; performing reception processing of receiving a query from another information processing device by wireless communication; processing the time-series data on the basis of the query received by the reception processing; and performing transmission processing of transmitting a processed processing result to the another information processing device by wireless communication.

A second program according to an aspect of the present technology for causing a computer to function as: a sensing unit that acquires environment information by a sensor and generates time-series data; a receiving unit that receives a query from another information processing device by wireless communication; a processing unit that processes the time-series data on the basis of the query received by the receiving unit; and a transmitting unit that transmits a processing result processed by the processing unit to the another information processing device by wireless communication.

An information processing system according to an aspect of the present technology is an information processing system including a first information processing device and a second information processing device that perform wireless communication, in which the first information processing device includes: a generating unit that generates a query; a first transmitting unit that transmits the query to the second information processing device; a first receiving unit that receives a processing result based on the query from the second information processing device; and a grouping unit that groups the second information processing device using the processing result, and the second information processing device includes: a sensing unit that acquires environment information by a sensor and generates time-series data; a second receiving unit that receives the query from the first information processing device; a processing unit that processes the time-series data on the basis of the query received by the second receiving unit; and a second transmitting unit that transmits a processing result processed by the processing unit to the first information processing device, and the first information processing device establishes a Layer 2 link with the second information processing device grouped by the grouping unit.

In the first information processing device, the first information processing method, and the first program according to an aspect of the present technology, the query is generated, the generated query is transmitted to each of the other information processing devices by wireless communication, the processing results based on the query from the other information processing devices are received by wireless communication, and the other information processing devices are grouped using the received processing results. Furthermore, the Layer 2 link between the information processing device and the other information processing devices that are grouped is established.

In the second information processing device, the second information processing method, and the second program according to an aspect of the present technology, the environment information is acquired by the sensor, the time-series data is generated, the query from another information processing device is received by wireless communication, the time-series data is processed on the basis of the received query, and the processed processing result is transmitted to the another information processing device by wireless communication.

In the information processing system according to an aspect of the present technology, the first information processing device and the second information processing device that perform the wireless communication are included. The first information processing device generates the query, transmits the query to the second information processing device, receives the processing result based on the query from the second information processing device, and groups the second information processing device using the processing result. The second information processing device acquires the environment information by the sensor and generates the time-series data, receives the query from the first information processing device, processes the time-series data on the basis of the received query, and transmits the processed processing result to the first information processing device. Then, the first information processing device establishes the Layer 2 link with the second information processing device grouped by the grouping unit.

Note that the information processing device may be an independent device or may be an internal block configuring one device.

Furthermore, the program can be provided by being transmitted via a transmission medium or by being recorded on a recording medium.

Effects of the Invention

According to an aspect of the present technology, connection settings for a plurality of wireless devices can be easily performed.

Note that an effect described here is not necessarily limited, and may be any effect described in the present disclosure.

MODE FOR CARRYING OUT THE INVENTION

Hereinafter, modes (hereinafter, referred to as embodiments) for carrying out the present technology will be described.

Configuration Example of System

Figure 1:
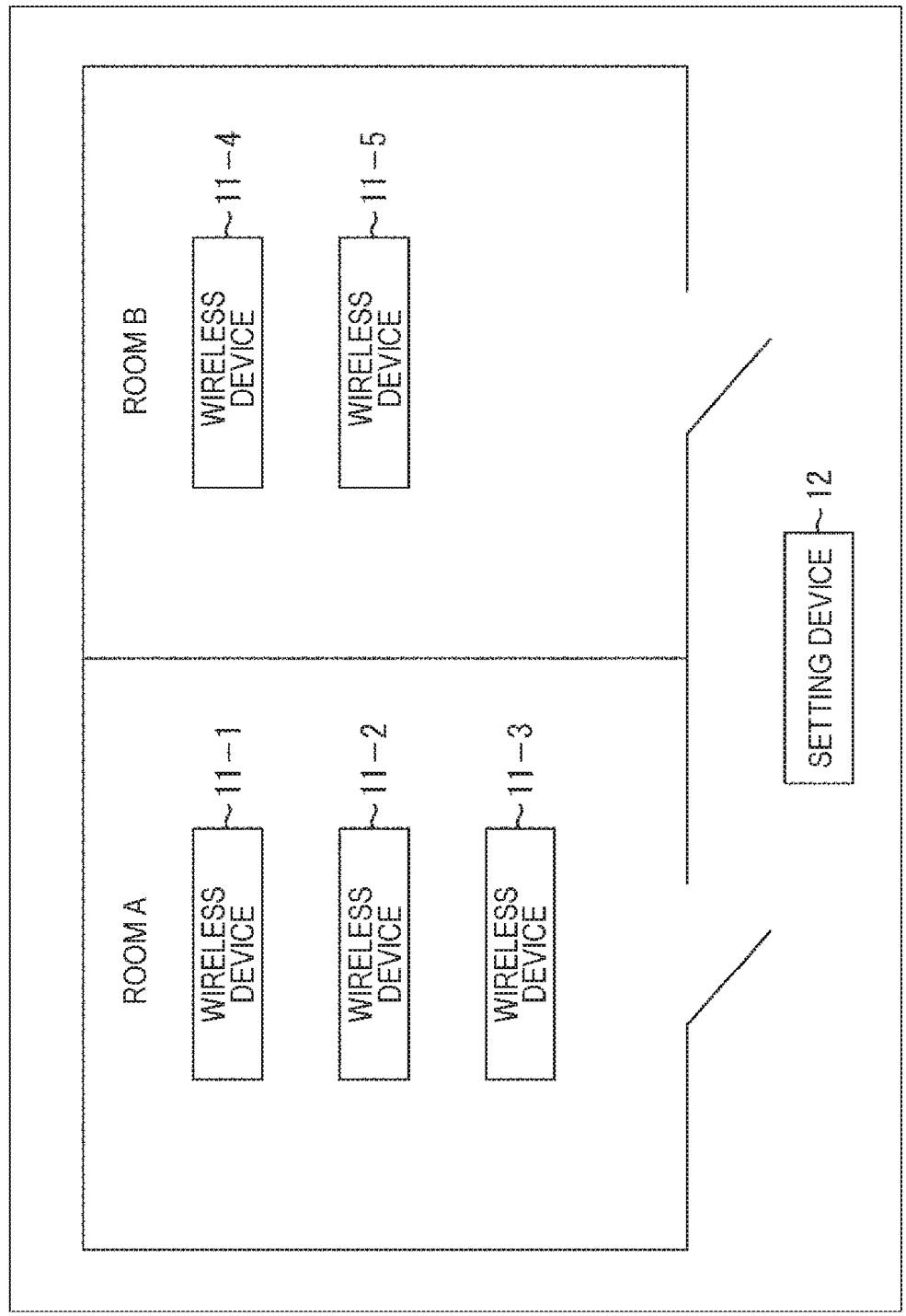
FIG. 1 is a diagram illustrating a configuration of an embodiment of a system to which the present technology is applied.

FIG. 1 is a diagram illustrating a configuration of an embodiment of a system to which the present technology is applied. The system illustrated in FIG. 1 includes wireless devices 11-1 to 11-5 and a setting device 12.

The wireless devices 11-1 to 11-3 are installed in a room A, and the wireless devices 11-4 and 11-5 are installed in a room B. Hereinafter, in a case where it is not necessary to distinguish the wireless devices 11-1 to 11-5 individually, the wireless devices 11-1 to 11-5 are simply described as a wireless device 11.

The wireless device 11 is a device that can wirelessly communicate with another device, for example, the setting device 12, and functions as an information processing device that processes predetermined information.

The setting device 12 is a device that performs a setting for operating the wireless device 11, a setting for connecting the wireless device 11 to a network in a step before performing such an operation, or the like, and is a device that functions as an information processing device that processes predetermined information.

The system illustrated in FIG. 1 includes devices corresponding to the Internet of things (IoT). The wireless device 11 is included in, for example, a lighting device, a refrigerator, a television receiver, an air conditioner, and the like. The setting device 12 is, for example, a smartphone, a tablet terminal or the like.

In the system illustrated in FIG. 1, an example in which five wireless devices 11 are installed is illustrated, but an application range of the present technology is not limited by the number of wireless devices. That is, the present technology may be applied to an example in which the number of wireless devices is five or more or may be applied to an example in which the number of wireless devices is five or less. Furthermore, a description will be continued by taking an example in which one setting device 12 is installed, but a plurality of setting devices 12 is also within an application range of the present technology.

Note that, here, a description will be continued by taking the room A and the room B as an example and taking a case where the wireless devices 11-1 to 11-5 are installed in the room A and the room B as an example, but a partition may not be a partition such as the room A and the room B, and may be a partition such as a space A and a space B partitioned from an inner portion of a large space or be a partition such as a predetermined space A in one room, for example, a space around a desk and a space B other than the predetermined space.

According to the present technology, it is possible to detect the wireless device 11 in a predetermined space and establish a connection of the detected wireless device 11 with the setting device 12. Here, the predetermined space is the room A or the room B illustrated in FIG. 1, and, for example, the wireless devices 11-1 to 11-3 in the room A can be selected from the wireless devices 11-1 to 11-5 and a connection of the selected wireless devices 11-1 to 11-3 with the setting device 12 can be established.

As described below, according to the present technology, a wireless device 11 desired as a candidate for a connection destination can be appropriately detected (selected). For example, as described above, when the wireless devices 11-1 to 11-3 in the room A are desired as candidates for a connection destination, the wireless devices 11-1 to 11-3 can be selected from the wireless devices 11-1 to 11-5 and be set as the candidates for the connection destination.

In a system to which the present technology is not applied, for example, when the setting device 12 is in the room A, in a case where a communication range of each of the wireless devices 11-1 to 11-5 covers the room A, the setting device 12 detects the wireless devices 11-1 to 11-5 as the candidates for the connection destination, such that it is difficult to appropriately detect (select) the desired wireless devices 11-1 to 11-3 in the room A. However, it becomes possible to appropriately detect (select) the desired wireless devices 11-1 to 11-3 in the room A by applying the present technology.

<Configuration of Wireless Device>

Figure 2:
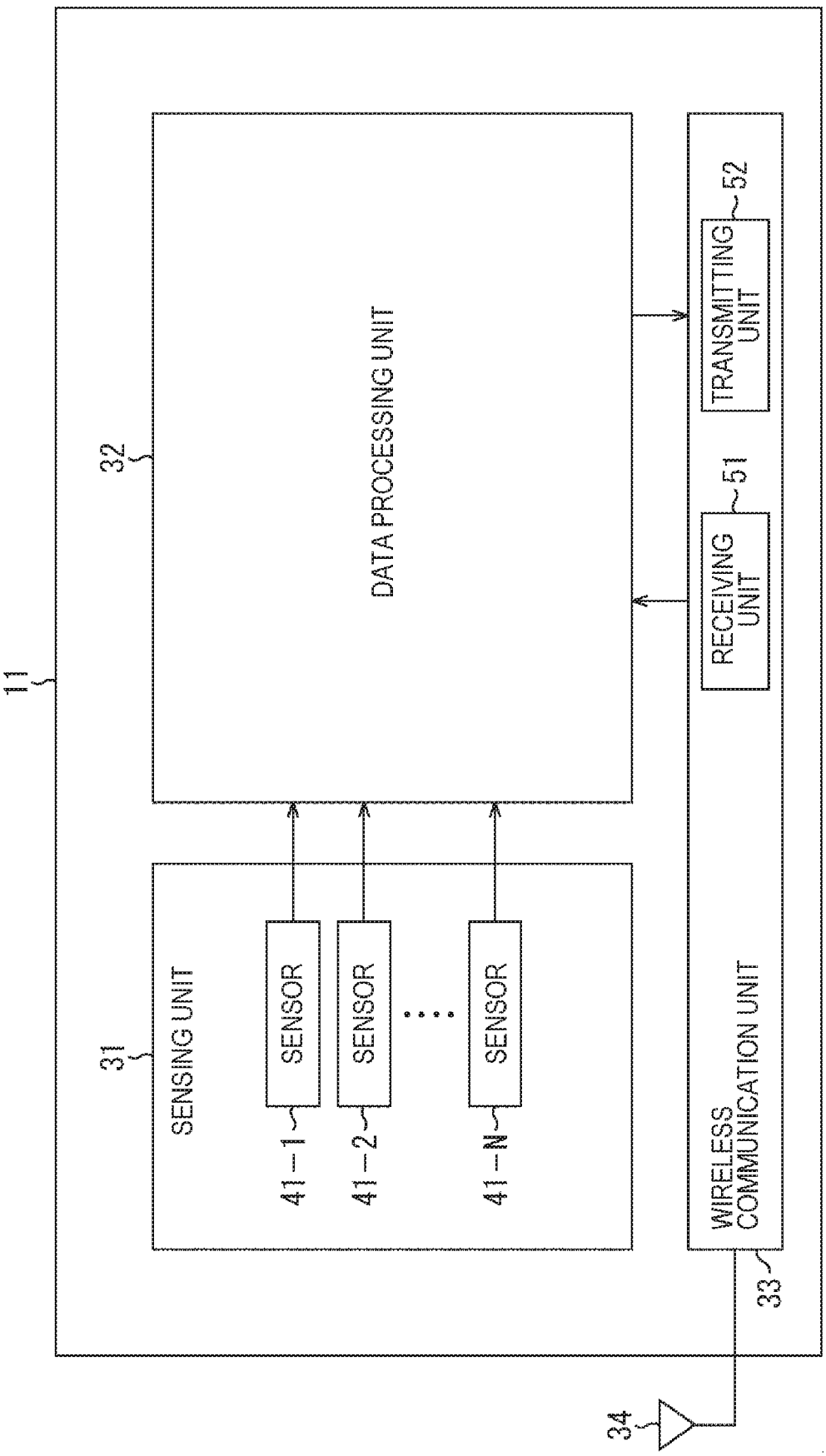
FIG. 2 is a diagram illustrating a configuration of an embodiment of a device to which the present technology is applied.

FIG. 2 is a diagram illustrating a configuration example of the wireless device 11. The wireless device 11 includes a sensing unit 31, a data processing unit 32, a wireless communication unit 33, and an antenna 34.

The wireless device 11 is, for example, a device such as the lighting device or the air conditioner, as described above, and has a function provided in such a device. However, here, an illustration and a description of such function will be omitted, and a configuration example of a portion necessary for the following description, in other words, a portion at least necessary when the wireless device functions as an Internet of things (IoT) device will be illustrated and described. Also in a setting device 12 as described later, similarly, a configuration example of a portion connected to the IoT device and at least necessary for performing some setting will be illustrated and described.

The sensing unit 31 includes a plurality of sensors 41-1 to 41-N. The sensing unit 31 has a function of measuring, for example, a temperature, a humidity, an atmospheric pressure, an illuminance, a sound, a vibration, and the like, and includes a temperature sensor, a humidity sensor, an atmospheric pressure sensor, an illuminance sensor, a microphone, a vibration sensor, and the like, for measuring the temperature, the humidity, the atmospheric pressure, the illuminance, the sound, the vibration, and the like, as sensors 41-1 to 41-N. In other words, the sensing unit 31 has a function of acquiring information regarding an environment around the wireless device itself. Hereinafter, the information acquired by the sensing unit 31 will be appropriately described as environment information, and a description will be continued on the assumption that the environment information is, for example, a temperature, a humidity, an atmospheric pressure, an illuminance, a sound, a vibration, and the like.

The sensing unit 31 supplies a sensed result (environment information) to the data processing unit 32, for example, every 1 millisecond (ms) or 1 second (s). The data processing unit 32 can generate time-series data regarding the environment information by sensor values periodically supplied from the sensing unit 31. The time-series data is a data series including a sensor value output by the sensor 41 and represented in an analog format or a digital format.

An example of the time-series data is, for example, data such as "010000101111000000000111". This is time-series data obtained when a binary sensor 41 whose sensor value can be only any one of "0" or "1" is used. This time-series data is an example, and is not a description indicating a limitation. The sensor 41 may not be a binary sensor, and may be configured to acquire time-series data that is in a format of the sensor value of the sensor 41.

Note that the sensing unit 31 may add information indicating time, such as time information, a counter value or the like when the sensor 41 outputs the sensor value, to the sensor value, and then output the sensor value.

The data processing unit 32 processes the time-series data from the sensing unit 31 and transmits the processed time-series data to the setting device 12 via the wireless communication unit 33, or executes processing based on a query supplied from the setting device 12 via the wireless communication unit 33.

The data processing unit 32 executes processing of extracting time-series data regarding the sensor 41 designated by the query from the time-series data output by the sensing unit 31 included in the wireless device 11 or processing of cutting out a certain pattern from the time-series data according to the query. Moreover, the data processing unit 32 may perform mathematical processing such as derivation of a peak value, derivation of an average value, calculation of a moving average, smoothing, or the like, from the time-series data.

The query generally represents a processing request (inquiry) for a database management system as a character string, and is used to issue a command such as search, update, deletion, or the like, of data to the system. Here, the query is for issuing a command generated by the setting device 12 and including a command to transmit a method of processing the time-series data and a processing result after processing the time-series data, as described in detail later, to the wireless device 11.

The wireless communication unit 33 has a receiving unit 51 and a transmitting unit 52. The wireless communication unit 33 has a function of transmitting and receiving a message to and from the surrounding setting device 12 or another wireless device 11 by wireless communication according to a wireless standard such as IEEE 802.11, Bluetooth (registered trademark), or the like. For example, the receiving unit 51 of the wireless communication unit 33 receives a query and the like from the setting device 12, and the transmitting unit 52 of the wireless communication unit 33 transmits data (data described as a processing result in the following description) processed by the data processing unit 32 to the setting device 12.

The wireless communication unit 33 is configured to be able to transmit and receive a query or a processing result from a step before establishing a link in Layer 2 (data link layer) between the setting device 12 and the wireless device 11.

In order to enable such transmission and reception, the wireless communication unit 33 stores the query or the processing result in a frame that can be transmitted and received before establishment of a Layer 2 link, such as a public action frame and performs transmission and reception, in a case where the wireless communication unit 33 performs communication on the basis of IEEE 802.11. Furthermore, the wireless communication unit 33 stores the query or the processing result in a frame that can be transmitted and received before establishment of a Layer 2 link, such as an advertisement frame and the like and performs transmission and reception, in a case where the wireless communication unit 33 performs communication on the basis of Bluetooth (registered trademark).

<Configuration of Setting Device>

Figure 3:
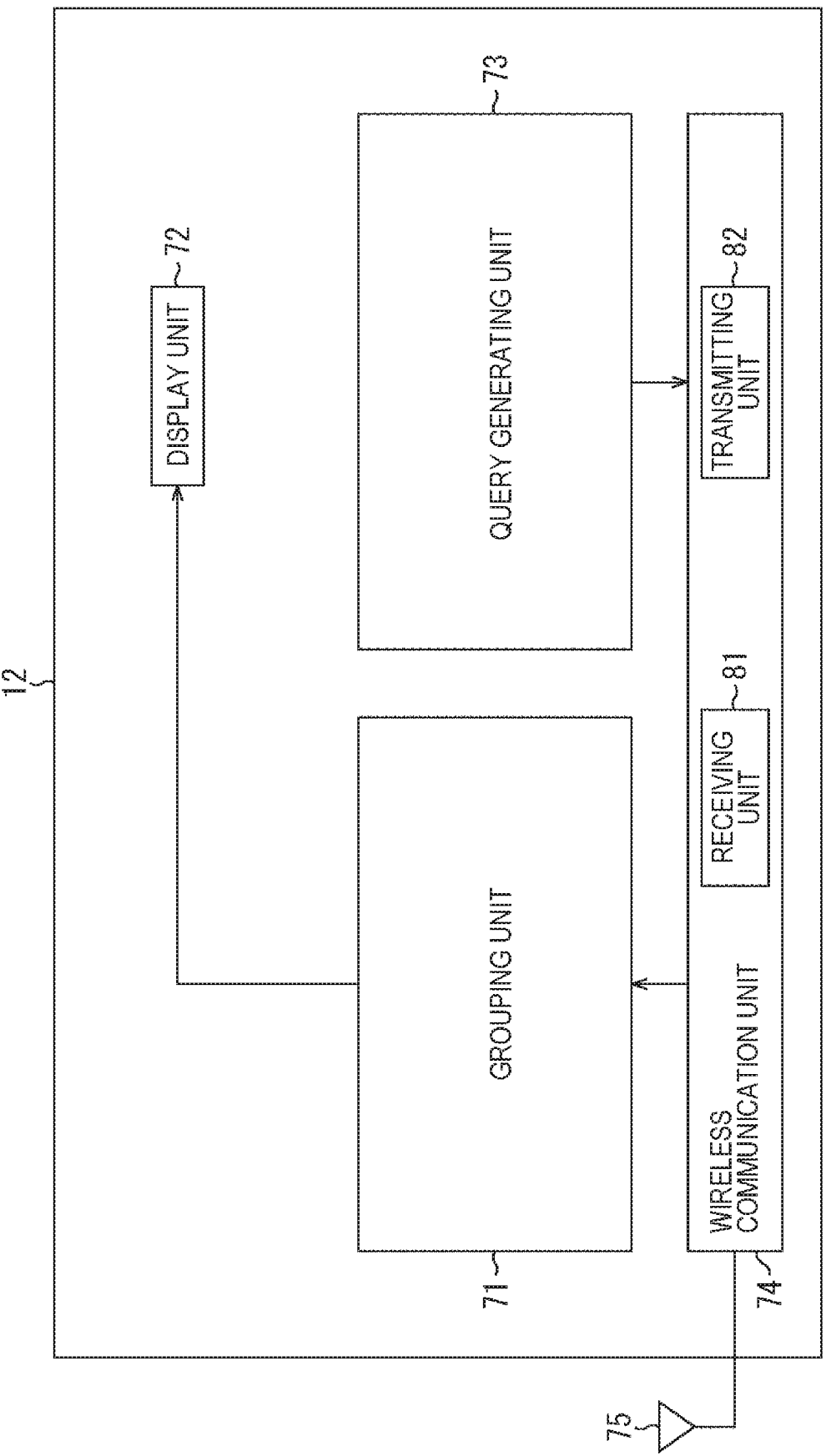
FIG. 3 is a diagram illustrating a configuration of an embodiment of a device to which the present technology is applied.

FIG. 3 is a diagram illustrating a configuration example of the setting device 12. The setting device 12 includes a grouping unit 71, a display unit 72, a query generating unit 73, a wireless communication unit 74, and an antenna 75.

The grouping unit 71 groups a plurality of wireless devices 11 determined to be in the same environment on the basis of processing results supplied from the plurality of wireless devices 11. Information of the grouped groups is presented to a user in, for example, a list format. In a case where the information is present as such, a list is displayed on the display unit 72.

The grouping unit 71 groups the wireless devices 11 on the basis of a context of an environment in which the wireless devices 11 are installed, using the processing results from the wireless devices 11 received by the receiving unit 81 of the wireless communication unit 74.

The grouping result is presented to the user via a GUI (Graphical User Interface) such as the display unit 72. The grouping unit 71 classifies the processing results into at least one or more groups.

The query generating unit 73 generates a query. The query generating unit 73 generates the query according to an input from a user, when a predetermined condition is satisfied, or the like. The predetermined condition is, for example, when position information is acquired and it is determined from the position information that the user is in a predetermined position, for example, a room A, or the like. The query generating unit 73 may generate a predefined query, in other words, store the query in advance, and read the query.

The generated query is transmitted to the wireless device 11 by the transmitting unit 82 of the wireless communication unit 74. Furthermore, as described later, a query for the setting device itself can be generated and processed.

The wireless communication unit 74 has a receiving unit 81 and a transmitting unit 82. The receiving unit 81 receives the processing result from the wireless device 11 and supplies the processing result to the grouping unit 71. The transmitting unit 82 transmits the query generated by the query generating unit 73 to the wireless device 11.

The wireless communication unit 74 has a function of transmitting and receiving a message to and from the surrounding setting device 12 or another wireless device 11 by wireless communication according to a wireless standard such as IEEE 802.11, Bluetooth (registered trademark), or the like, similar to the wireless communication unit 33 of the wireless device 11. For example, the receiving unit 81 of the wireless communication unit 74 receives the processing result from the wireless device 11, and the transmitting unit 82 transmits the query generated by the query generating unit 73 to the wireless device 11.

The wireless communication unit 74 is configured to be able to transmit and receive the query or the processing result from the step before establishing the link in Layer 2 (data link layer) between the setting device 12 and the wireless device 11.

In order to enable such transmission and reception, the wireless communication unit 74 stores the query or the processing result in a frame that can be transmitted and received before establishment of a Layer 2 link, such as a public action frame and performs transmission and reception, in a case where the wireless communication unit 74 performs communication on the basis of IEEE 802.11. Furthermore, the wireless communication unit 74 stores the query or the processing result in a frame that can be transmitted and received before establishment of a Layer 2 link, such as an advertisement frame and the like and performs transmission and reception, in a case where the wireless communication unit 74 performs communication on the basis of Bluetooth (registered trademark).

<Operation of System>

An overview of an operation of the system illustrated in FIG. 1 will be described with reference to FIG. 4.

The wireless devices 11-1 to 11-5 acquire environment information around the wireless devices 11-1 to 11-5 themselves by the sensing units 31 and generate time-series data 101-1 to 101-5 at any time, respectively.

The setting device 12 transmits a query 121 describing a method of processing time-series data 101 to the wireless device 11 at a predetermined timing. Queries 121 having the same content are simultaneously transmitted to the wireless devices 11-1 to 11-5.

Each time the time-series data 101 is updated, the wireless devices 11-1 to 11-5 process the time-series data 101 according to the received queries 121, generate processing results 102-1 to 102-5 on the basis of the queries 121, and transmit the processing results 102-1 to 102-5 to the setting device 12, respectively.

The setting device 12 groups the wireless devices 11-1 to 11-5 using the processing results 102-1 to 102-5 when the setting device 12 receives the processing results 102-1 to 102-5. Then, the setting device 12 presents a grouped wireless device group 141 to the user via a means such as a GUI and the like.

Here, since the wireless devices 11-1 to 11-3 are installed in the room A (FIG. 1), the time-series data 101-1 to 101-3 obtained by each of the wireless devices 11-1 to 11-3 are the same or similar data. That is, since the wireless devices 11-1 to 11-3 are in the same environment such as the room A, the obtained environment information is similar information. Therefore, the processing results 102-1 to 102-3 transmitted from the wireless devices 11-1 to 11-3 to the setting device 12 are also similar information.

Similarly, since the wireless devices 11-4 and 11-5 are installed in the room B (FIG. 1) and are in the same environment as the room B, the obtained environment information is similar information. Therefore, the processing results 102-4 and 102-5 transmitted from the wireless devices 11-4 and 11-5 to the setting device 12 are also similar information.

The setting device 12 performs the grouping on the wireless devices 11-1 to 11-5 using the processing results 102-1 to 102-5, and groups the wireless devices 11 having similar processing results 102 into the same group.

Therefore, in this case, since the processing results 102-1 to 102-3 are similar to each other, the wireless devices 11-1 to 11-3 that have transmitted the processing results 102-1 to 102-3 are grouped into the same group. Furthermore, since the processing results 102-4 and 102-5 are similar to each other, the wireless devices 11-4 and 11-5 that have transmitted the processing results 102-4 and 102-5 are grouped into the same group.

Figure 4:
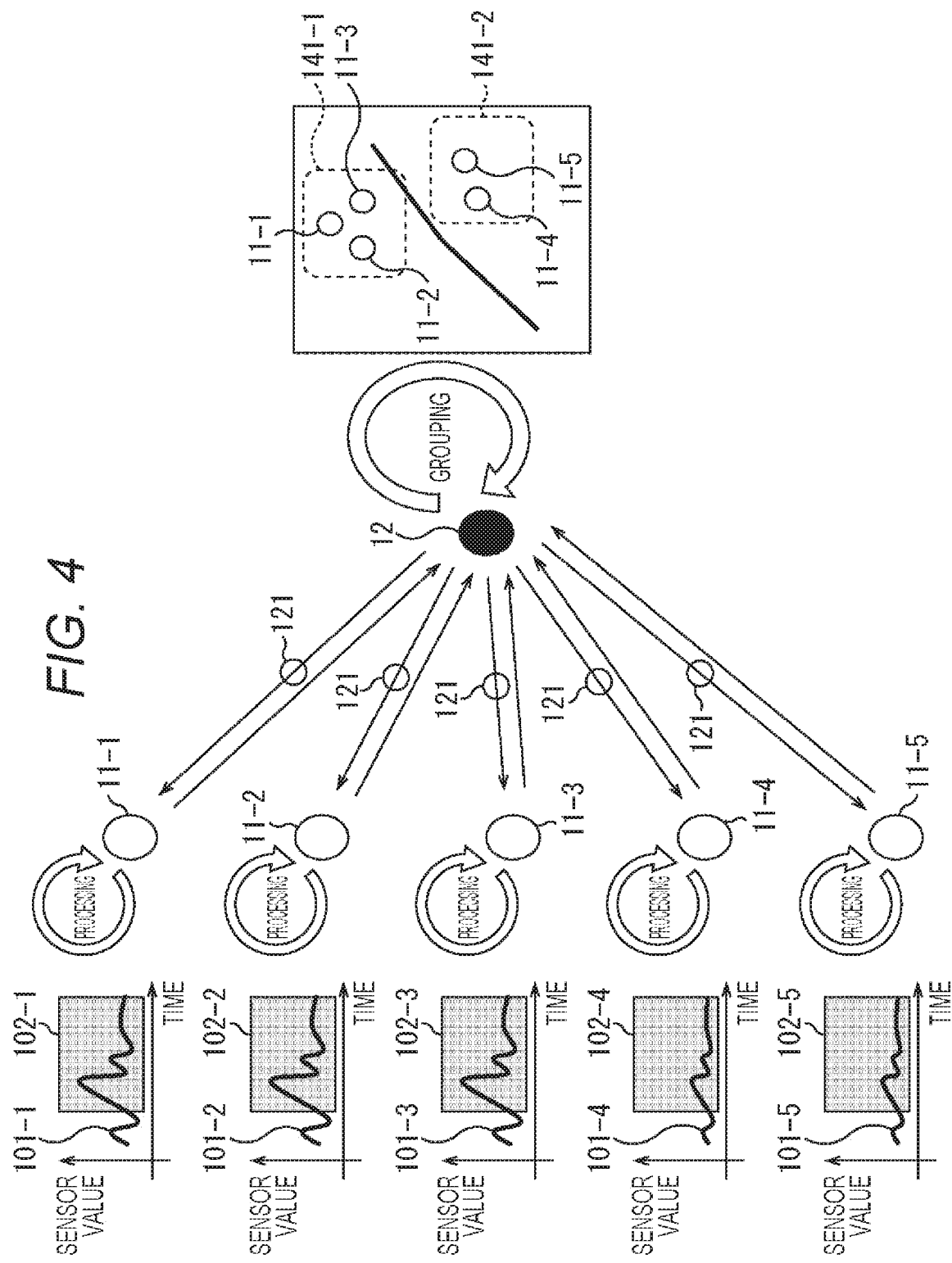
FIG. 4 is a diagram for describing an overview of an operation of the system.

As a result of the grouping by the setting device 12, as illustrated in FIG. 4, a grouping result in which the wireless devices 11-1 to 11-3 in the room A are included in a wireless device group 141-1 and the wireless devices 11-4 and 11-5 in the room B are included in a wireless device group 141-2 is obtained. The result may be, for example, listed and presented to the user.

<First Processing in Each Device>

Figure 5:
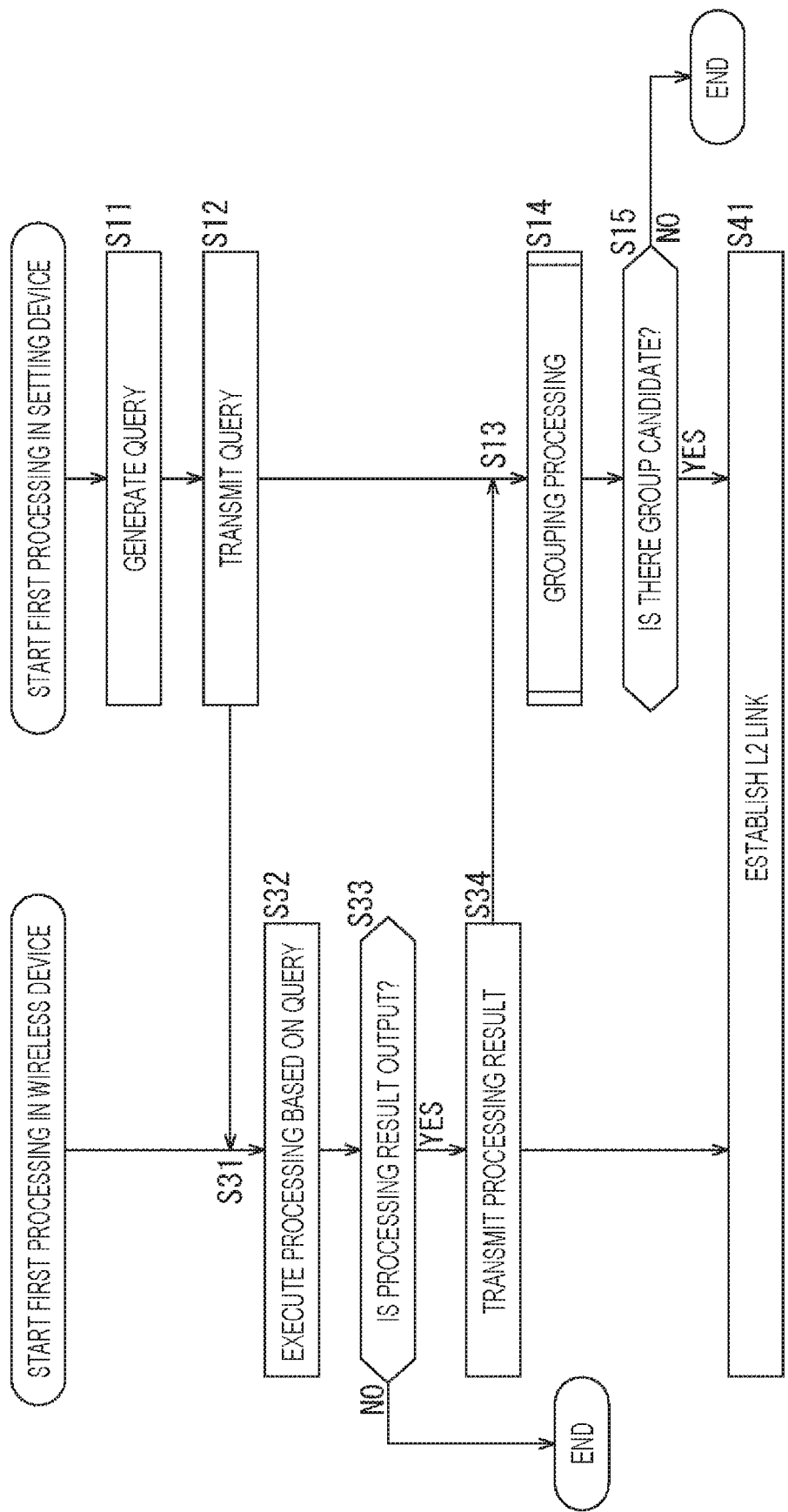
FIG. 5 is a flowchart for describing processing of a system according to a first embodiment.

Details of the operation of the system illustrated in FIG. 1 described with reference to FIG. 4 will be described with reference to FIG. 5. FIG. 5 is a flowchart for describing processing (hereinafter, referred to as a first embodiment) in each of the wireless device 11 and the setting device 12.

In step S11, the setting device 12 generates the query 121. The generation of the query 121 is performed when the user instructs the setting device 12 to generate the query 121 (instructs the setting device 12 to select the wireless device 11 and group the wireless device 11). Furthermore, the setting device 12 may have a function that can measure a position of the setting device 12 itself, such as a global positioning system (GPS) and the like, and generate the query 121, for example, when the setting device 12 determines that the setting device 12 is located at a position set in advance as a grouping start position. A timing of the generation of the query 121 may be a timing other than the timing described above.

The generated query 121 includes at least information designating the sensor 41, such as a type of the sensor 41 (FIG. 2), and the like, information designating a partial section for processing the time-series data, and information designating mathematical processing such as averaging and the like. Here, an example of the query 121 is shown.

SELECT AVG(signal) From S [RANGE 10 MINUTES] WHERE sensor_id=temp

The query 121 shown here is a query including a command to designate a temperature sensor (temp) as a sensor type (sensor_id) and calculate an average value (AVG(signal)) of time-series data S [RANGE 10 MINUTES] obtained for the past 10 minutes by the temperature sensor. The query 121 shown here is an example and is not a description indicating a limitation.

The query 121 generated as such is transmitted to the wireless device 11 in step S12 (FIG. 5).

In a case where the wireless communication unit 74 of the setting device 12 (FIG. 3) performs communication according to IEEE 802.11, the query 121 generated by the query generating unit 73 can be stored and transmitted in, for example, a query request feed of a GAS initial request frame, which is a kind of public action frame.

Note that, here, a description will be continued by taking the public action frame of IEEE 802.11 as an example, but communication using an advertising frame of Bluetooth (registered trademark) low energy (BLE), and the like, may also be performed. Such a frame is a frame that can be transmitted and received before the establishment of the Layer 2 link, and can be any frame that can be transmitted and received before the establishment of such a Layer 2 link in the present technology.

Figure 6:
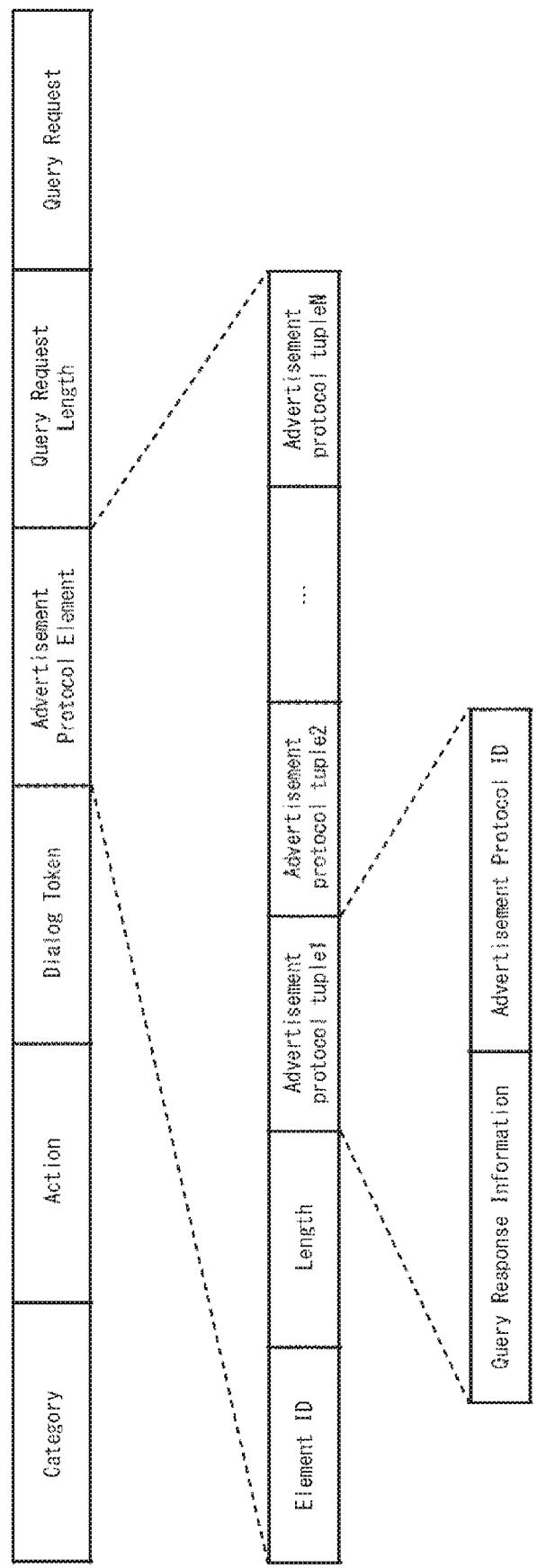
FIG. 6 is a diagram illustrating an example of a query transmitted and received.

FIG. 6 is a diagram illustrating a format example of the GAS initial request frame. The GAS initial request frame is one of public action frames. The public action frame refers to a frame defined for communication between basic synchronized subsets (BSSs) or between an access point (AP) and a non-AP station (STA) that is not coupled to the AP or a general advertisement service.

The public action frame includes a GAS initial request frame, a GAS initial response frame, a GAS comeback request frame, a GAS comeback response frame, and the like.

Referring to FIG. 6, the GAS initial request frame includes a category field (Category), an action field (Action), a dialog token field (Dialog Token), an advertisement protocol element field (Advertisement Protocol Element), a query request length field (Query Request Length), and a query request field (Query Request).

The category field is set to a value indicating the public action frame. The action field is set to a value indicating a GAS initial request action. The dialog token field is set to an arbitrary value selected by the NON-AP STA transmitting the GAS initial request frame, and is a field for identifying an exchange between the GAS initial request frame and a GAS initial response frame corresponding to the GAS initial request frame.

A format of the advertisement protocol element includes an element ID field (Element ID), a length field (Length), and N (N is a natural number) advertisement protocol tuple fields (Advertisement protocol Tuple #1, Advertisement protocol Tuple #2, . . . Advertisement protocol Tuple #N).

The element ID field is set to a value indicating an advertisement protocol information element. The length field is set to a value indicating the sum of lengths of the N advertisement protocol tuple fields after the length field.

Furthermore, each advertisement protocol tuple field includes a query response information field (Query Response Information) and an advertisement protocol ID field (Advertisement Protocol ID).

The query response information field includes information of a delivery method or a query response length limit. The delivery method is set to a value indicating a method of delivering a frame for an advertisement protocol specified in an advertisement protocol ID subfield by the AP.

The advertisement protocol ID subfield is set to a value indicating a native query protocol. The native query protocol is a mechanism that the NON-AP STA uses to query the AP in order to obtain data provided locally. That is, in a case where there is a query from the NON-AP STA, the AP immediately responds to the received query without inquiring of a distribution system (DS) or a server in an external network about the requested query.

The query request length field is set to a value indicating a total length of information included in the query request field after the query request length field. The query request field is a GAS query, and is formatted according to a protocol specified in the advertisement protocol information element. In a case of transmitting the query 121 generated by the query generating unit 73, the query 121 as described above is described in the query request field.

An example of the query 121 is shown again.
SELECT AVG(signal) From S [RANGE 10 MINUTES] WHERE sensor_id=temp Such a query 121 can be stored in a query request feed. This is an example, and is not limited thereto, but in the following description, a description will be continued by taking a case of processing the query 121 as an example.

Note that the query can be a query described in a format similar to a structured query language (SQL) and the like. Furthermore, the data processing unit 32 of the wireless device 11 that processes the query 121 can be realized by applying a sensor bee of existing open source software (OSS) or another similar software, and the query 121 can be applied without being limited to the example described above as long as it can be processed by such software.

Returning to the description of the flowchart of FIG. 5, when the query 121 is transmitted from the setting device 12 in step S12, the wireless device 11 receives the query 121 from the setting device 12 in step S31. The query 121 received by the receiving unit 51 (FIG. 2) of the wireless communication unit 33 of the wireless device 11 is supplied to the data processing unit 32.

The data processing unit 32 executes processing based on the query 121 in step S32. In a case where the data processing unit 32 performs the processing based on the query 121 as described above, the data processing unit 32 extracts the time-series data 101-1 for the past 10 minutes designated by the query 121 from the time-series data 101-1 (FIG. 4) obtained from the temperature sensor (here, a description will be continued on the assumption that the sensor 41-1 is the temperature sensor) of the sensing unit 31 designated by the query 121.

Moreover, the data processing unit 32 performs an arithmetic operation designated by the query 121, in this case, an arithmetic operation of calculating an average value of the time-series data 101-1 for the past 10 minutes, and transmits an arithmetic operation result to the setting device 12 as the processing result 102-1. Before the data processing unit 32 transmits the processing result 102-1 to the setting device 12, the data processing unit 32 determines whether or not to output the processing result in step S33.

In the determination in step S33, for example, it is determined whether or not the processing result 102, in this case, the average value of the sensor value is equal to or greater than a predetermined threshold value, and it is determined to transmit the processing result 102 in a case where the processing result 102 is equal to or greater than the predetermined threshold value. Information (instruction) regarding whether or not to make such a determination, a threshold value for making such a determination, and the like can be described in the query 121. Alternatively, a condition for outputting the processing result 102 may be set in the data processing unit 32.

In a case where the data processing unit 32 determines not to output the processing result 102 in step S33, for example, in a case where the data processing unit 32 determines that the processing result 102 is equal to or less than the threshold value, the processing for the query 121 in the wireless device 11 ends.

On the other hand, in a case where the data processing unit 32 determines to output the processing result 102 in step S33, the processing proceeds to step S34. In step S34, the processing result 102-1 is supplied from the data processing unit 32 to the transmitting unit 52 of the wireless communication unit 33, and is transmitted to the setting device 12 by processing of the transmitting unit 52.

The wireless communication unit 33 can be configured to perform the wireless communication according to IEEE 802.11 as described above. In a case where the wireless communication unit 33 performs the wireless communication according to IEEE 802.11, the processing result 102-1 from the data processing unit 32 can be stored and transmitted in, for example, a query request feed of a GAS initial response frame, which is a kind of public action frame.

Figure 7:
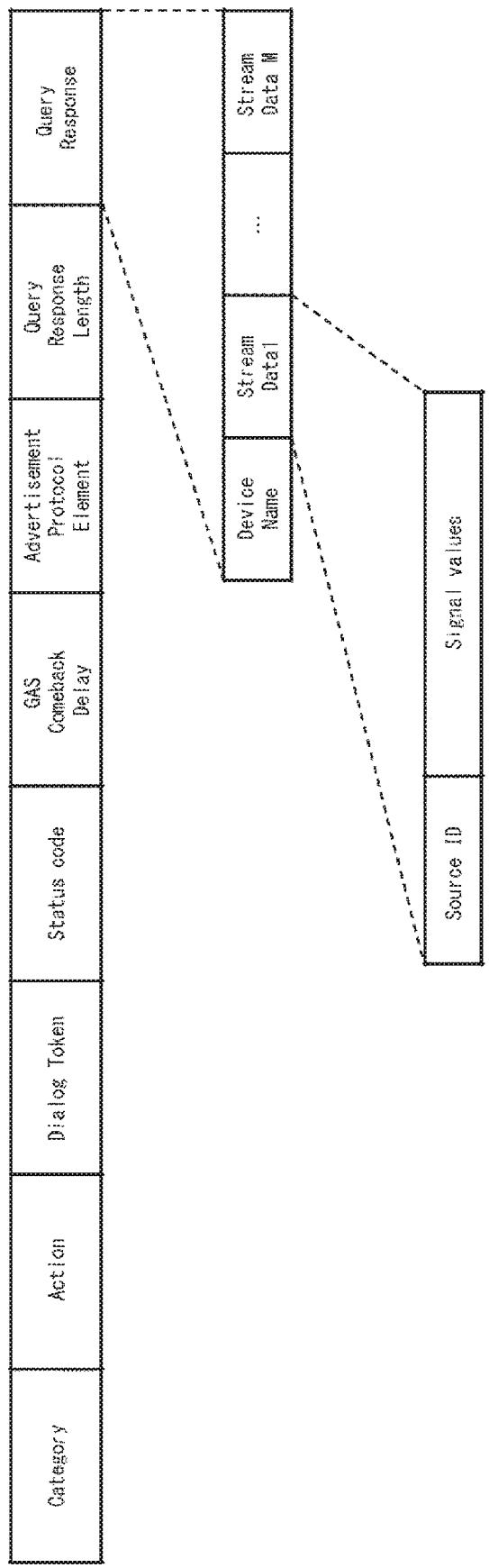
FIG. 7 is a diagram illustrating an example of a processing result transmitted and received.

FIG. 7 is a block diagram illustrating a format of the GAS initial request frame.

Referring to FIG. 7, the GAS initial response frame includes a category field (Category), an action field (Action), a dialog token field (Dialog Token), a status code field (Status Code), a GAS comeback delay field (GAS Comeback Delay), an advertisement protocol element (Advertisement Protocol Element), a query response length field (Query Response Length), and a query response field (Query Response).

The category field is set to a value indicating the public action frame. The action field is set to a value indicating a GAS initial response action. The dialog token field is set to the same value as the value set in the corresponding GAS initial request frame, that is, the received GAS initial request frame. The status code field is set to a value indicating a result of a response to the request, and the like.

The GAS comeback delay field is a field for specifying a delay time. The advertisement protocol element includes information for identifying particular advertisement protocol and its corresponding advertisement control. An example of a format of the advertisement protocol element has been described above with reference to FIG. 6, and a detailed description thereof will thus be omitted.

The query response length field is set to a value indicating a length of information included in the query response field after the query response length field. The query response field is a general-purpose container, and a value of the query response field is a response to the GAS query and is formatted according to a protocol specified in the advertisement protocol information element. According to the present embodiment, the query response field includes a device name field (Device Name) and stream data fields (Stream Data 1, . . . , Stream Data M).

The device name indicates a name of the wireless device 11. The stream data includes a source ID field (Source ID) and a signal value field (Signal values). The source ID is an ID assigned to the sensor 41, and the processing result 102 obtained by the sensor 41 is stored in the signal value field.

The processing result 102 is transmitted to the setting device 12 using such a GAS initial response frame. Note that the GAS initial response frame is an example, and the processing result 102 may be transmitted to the setting device 12 using another frame (communication manner).

Returning to the description with reference to the flowchart of FIG. 5, when the processing result 102 is transmitted from the wireless device 11 to the setting device 12 in step S34, the setting device 12 receives the transmitted processing result 102 in step S13.

When the setting device 12 receives the processing result 102, the setting device 12 starts grouping processing in step S14. The grouping processing executed in step S14 will be described with reference to a flowchart of FIG. 8.

The grouping is processing of classifying the wireless devices 11 in which results sensed by the sensing units 31 are similar to each other into the same group, as described with reference to FIG. 4. In this case, since the processing results 102 are respectively transmitted from the plurality of wireless devices 11, processing of comparing these processing results 102 with each other and classifying the wireless devices 11 having similar processing results 102 into the same group is executed.

A case where a group in which the number of wireless devices 11 is equal to or more than a predetermined number is selected at the time of selecting a group to be presented to the user among a plurality of groups when the plurality of groups is generated as a result of the grouping will be described by way of example, but the present technology can also be applied in a case where a group is selected under a condition other than such a selection condition.

Figure 8:
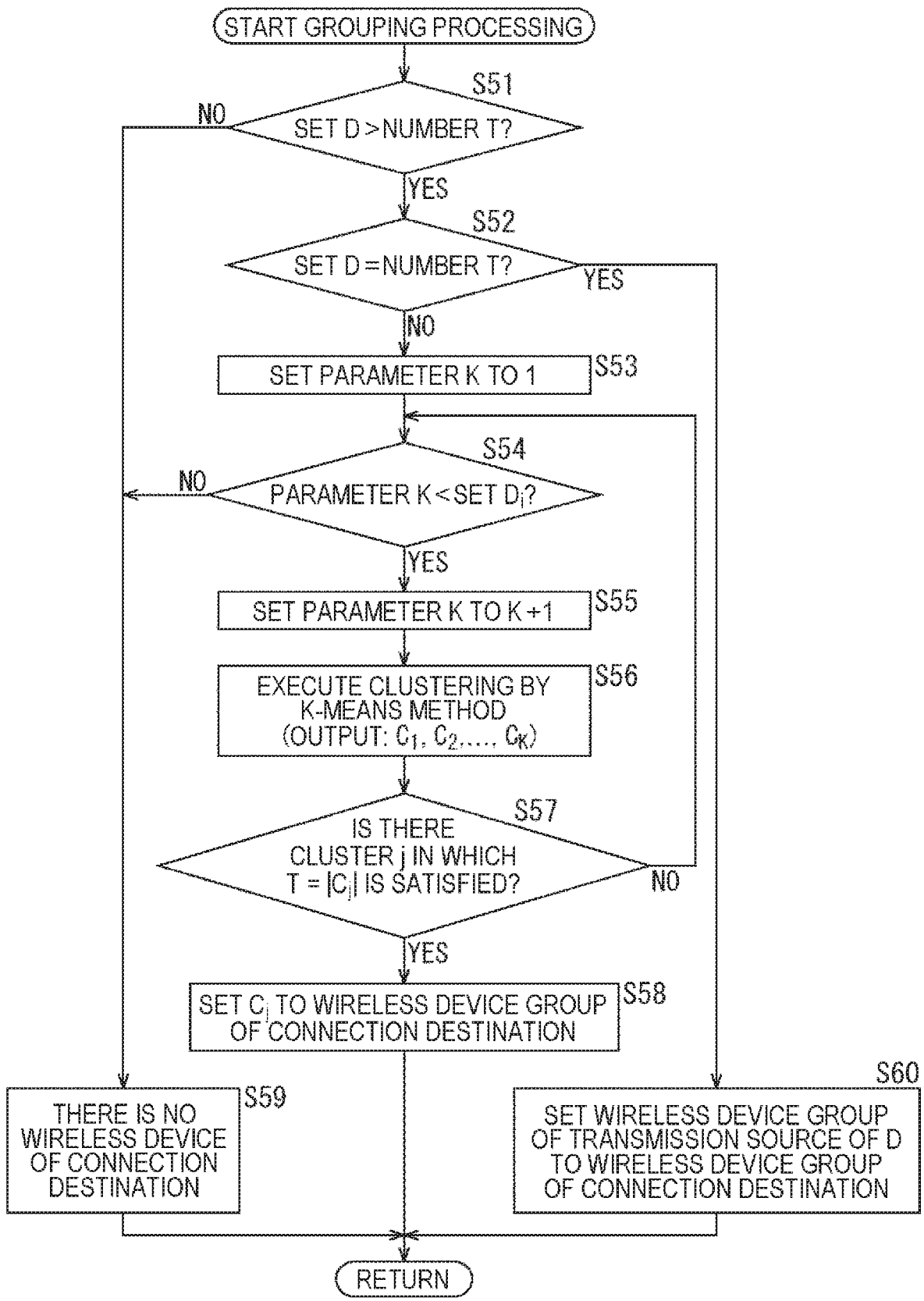
FIG. 8 is a flowchart for describing processing related to grouping.

Referring to the flowchart illustrated in FIG. 8, in step S51, it is determined whether or not the number (hereinafter, referred to as a set D) of received processing results 102 is equal to or more than the required number T of wireless devices 11.

The required number T of wireless devices 11 is, for example, the number preset by the user. Alternatively, the required number T of wireless devices 11 may be the number set by default without depending on an instruction of the user.

In a case where it is determined in step S51 that the set D is not equal to or more than the number T, in other words, in a case where it is determined that the number of wireless devices 11 around the setting device 12 (the number of wireless devices 11 that have transmitted the processing results 102) is less than the number T set by the user, the processing proceeds to step S59. In step S59, a determination result that there is no wireless device 11 of a connection destination is obtained.

In this case, since a sufficient number of wireless devices 11 are not present in the vicinity of the setting device 12, the setting device 12 determines that a candidate for a wireless device 11 of a connection target could not be detected and outputs the fact that the candidate for the wireless device 11 of the connection target could not be detected to the user, and the grouping processing ends. For example, in a case where the user has instructed the setting device 12 to start the grouping, a message such as, for example, "a wireless device of a connection symmetry could not be detected" is displayed on the display unit 72.

On the other hand, in a case where it is determined in step S51 that the set D is equal to or more than the number T, in other words, in a case where it is determined that the number of wireless devices 11 around the setting device 12 (the number of wireless devices 11 that have transmitted the processing results 102) is equal to or more than the number T set by the user, the processing proceeds to step S52.

In step S52, it is determined whether or not the number of the processing results 102 included in the set D and the set number T of wireless devices 11 are the same as each other. In a case where it is determined in step S52 that the set D and the number T are the same as each other, the processing proceeds to step S60.

In this case, since the set number of wireless devices 11 and the number of wireless devices 11 actually detected coincides with each other, all of the detected wireless devices 11 are grouped into one group, and are set as candidates for the wireless device 11 of the connection destination. That is, in step S60, the wireless device group 141 (FIG. 4) of the wireless devices 11 that have transmitted the processing results 102 included in the set D is set as a wireless device group 141 of the connection destination.

On the other hand, in a case where it is determined in step S52 that the set D and the number T are not the same as each other, the processing proceeds to step S53. In this case, the set D (the number of processing results 102 included in the set D) may be more than the number T set by the user.

In processing of steps S53 to S58, processing of extracting a group including T wireless device groups 141 from the wireless device group 141 that has transmitted the processing results 102 included in the set D and setting the group including the T wireless device groups 141 to the connection destination is executed. Here, a case where a K-means method is used as an example of an algorithm of grouping the wireless devices 11 will be described by way of example, but an algorithm other than the K-means method can be applied to the present technology.

In a case where the K-means method is used as the algorithm of grouping the wireless devices 11, the wireless devices 11 are classified into K clusters using the processing results 102. Note that a parameter K is a parameter that designates the number of groups, and in the present embodiment, the following algorithm is executed while sequentially increasing K from K=1 until a group in which the number of processing results 102 included in the group is equal to the required number T of wireless devices 11 is found.

First, in step S53, the parameter K is set to 1. Then, in step S54, it is determined whether or not the parameter K is smaller than a set Di. The set Di is the number of processing results 102 included in a predetermined group. In a case where it is determined in step S54 that the parameter K is greater than the set Di, the processing proceeds to step S59. In step S59, it is notified that there is no wireless device 11 of the connection destination.

On the other hand, in a case where it is determined in step S54 that the parameter K is smaller than the set Di, the processing proceeds to step S55. In step S55, the parameter K is updated to K+1. Then, processing in step S56 is executed using the updated parameter K.

In step S56, class C1, class C2, . . . , class Ck are output by performing clustering by the K-means method.

First, the grouping unit 71 randomly assigns an identifier i ($1 \leq i \leq k$) indicating any one of the K groups to the processing results 102 received from the wireless devices 11. Then, the grouping unit 71 calculates the center vi of each group i using the processing results 102, and updates a class to which each processing result 102 belongs to a class vj obtained according to the following Equation (1), for every processing result 102.

[Equation 1]
$$v_j = \arg\min_i d(x, v_i) \quad (1)$$

In Equation 1, symbol x indicates a vector corresponding to the processing result 102, and symbol Vi indicates a center calculated from the processing result 102 classified into a group i. Furthermore, d(x,vi) indicates that a distance between the vector x and a vector vi is obtained by a function d.

As the function d, for example, a function or the like of calculating a Euclidean distance, a square error, or a dynamic time warping distance can be used. The function d may be a function other than that listed here.

A determination in step S57 is made using the class vj obtained according to Equation 1, that is, in this case, class C1, class C2, . . . , class Ck. In step S57, it is determined whether or not there is a class Cj whose number is the same as the number T. In a case where it is determined in step S57 that there is no class Cj whose number is the same as the number T, the processing returns to step S54, and the processing after step S54 is repeated.

That is, update of the class to which the processing result 102 belongs is repeated until there is no change in the group assigned to all the processing results 102 or until the change becomes equal to or less than a certain value. Then, in a case where it is determined in step S57 that there is a class Cj whose number is the same as the number T, the processing proceeds to step S58.

In step S58, the wireless devices 11 belonging to the class Cj whose number is determined to be the same as the number T are set to the wireless device group 141 of the connection destination.

As such, when the wireless device group 141 is set, the processing proceeds to step S15 (FIG. 5).

Note that a type of the wireless devices 11 or the environment information is not limited to one type, but the processing results 102 may be classified according to the type of the wireless devices 11 or the environment information and the respective processing results 102 may then be grouped.

The following method may be used as another grouping method.

As a value of the function d(x,vi) used by using the processing result 102 becomes larger, the wireless device 11 is located closer to a boundary with another group, which indicates that there is a high possibility that the processing result 102 will not belong to the group assigned to the processing result 102. Based on this, in all the wireless devices 11 included in the group i, values of the function d(x,vi) are calculated, and a likelihood of the group is calculated using the calculated values.

The likelihood decreases as the number of wireless devices 11 located near the boundary with another group increases. A specific calculation equation of the likelihood that can be applied to the present technology is not limited, and any calculation equation may be used, but, for example, a calculation equation for calculating an average value of the function d(x,vi) and the like can be used.

A value of the likelihood may be used to provide a user interface so that the wireless devices 11 configuring the groups are displayed in a manner of displaying a likely group in blue and displaying another unlikely group in red.

Returning to the description of the flowchart of FIG. 5, when the grouping processing in step S14 ends, the processing proceeds to step S15. In step S15, it is determined whether or not there is a group candidate.

Determination processing in step S15 is executed using a result of the grouping processing in step S14. Referring to the flowchart of FIG. 8 again, in a case where the processing proceeds to step S58 or step S60, such that the wireless device group 141 has been set, it is determined in step S15 that there is a group candidate, and in a case where the processing proceeds to step S59, such that the wireless device group 141 has not been set, it is determined in step S15 that there is no group candidate.

In a case where it is determined in step S15 that there is no group candidate, the processing in the setting device 12 ends. Before the processing in the setting device 12 ends, a message notifying the user that there is no wireless device 11, which is a connection symmetry, may be displayed on the display unit 72 (FIG. 2).

On the other hand, in a case where it is determined in step S15 that there is a group candidate, the processing proceeds to step S41. Note that before the processing proceeds to step S41, a list of the wireless devices 11, which are the connection symmetry, a message for causing the user to recognize that there is a group candidate, or the like, may be displayed on the display unit 72 (FIG. 2). Furthermore, in a case where the list is displayed on the display unit 72, identifiers (such as media access control (MAC) addresses and the like) of the wireless devices 11 can be displayed in the displayed list.

Furthermore, in a case where the list is displayed or in a case where the message or the like for causing the user to recognize that there is a group candidate is displayed, when there was an instruction from the user, the processing may proceed to step S41.

In step S41, an L2 link is established. The L2 link is established between the setting device 12 and the wireless device 11 set as the group candidate. By applying the present technology, a link can also be established through a series of sequences involving connection permission by the wireless device 11 and the setting device 12 described above. Here, this link establishment is referred to as Layer 2 link (L2 link) establishment.

In a case where the wireless communication unit 33 (FIG. 2) of the wireless device 11 or the wireless communication unit 74 (FIG. 3) of the setting device 12 performs communication using IEEE 802.11, the L2 link can be established by exchanging a series of frames configuring an association request, an association response, or a 4-way handshake.

When the L2 link is established, the setting device 12 can acquire more detailed information of the wireless device 11 or operate the wireless device 11.

As such, according to the present technology, the setting device 12 can transmit the query describing the method of processing the time-series data to the data processing unit 32 that processes the time-series data in the wireless device 11 even in a step where the setting device 12 and the wireless device 11 have not established the Layer 2 link.

Furthermore, the wireless device 11 can transmit the processing result of the time-series data to the grouping unit 71 in the setting device 12 even in the step where the setting device 12 and the wireless device 11 have not established the Layer 2 link.

<Second Processing in Each Device>

Next, a second embodiment will be described.

In the second embodiment, in addition to the first embodiment, a setting device 12 also acquires environment information around the setting device itself, and performs grouping of wireless devices 11 using the acquired environment information. The setting device 12 has a configuration as illustrated in FIG. 9 in order to acquire environment information around the setting device itself.

Figure 9:
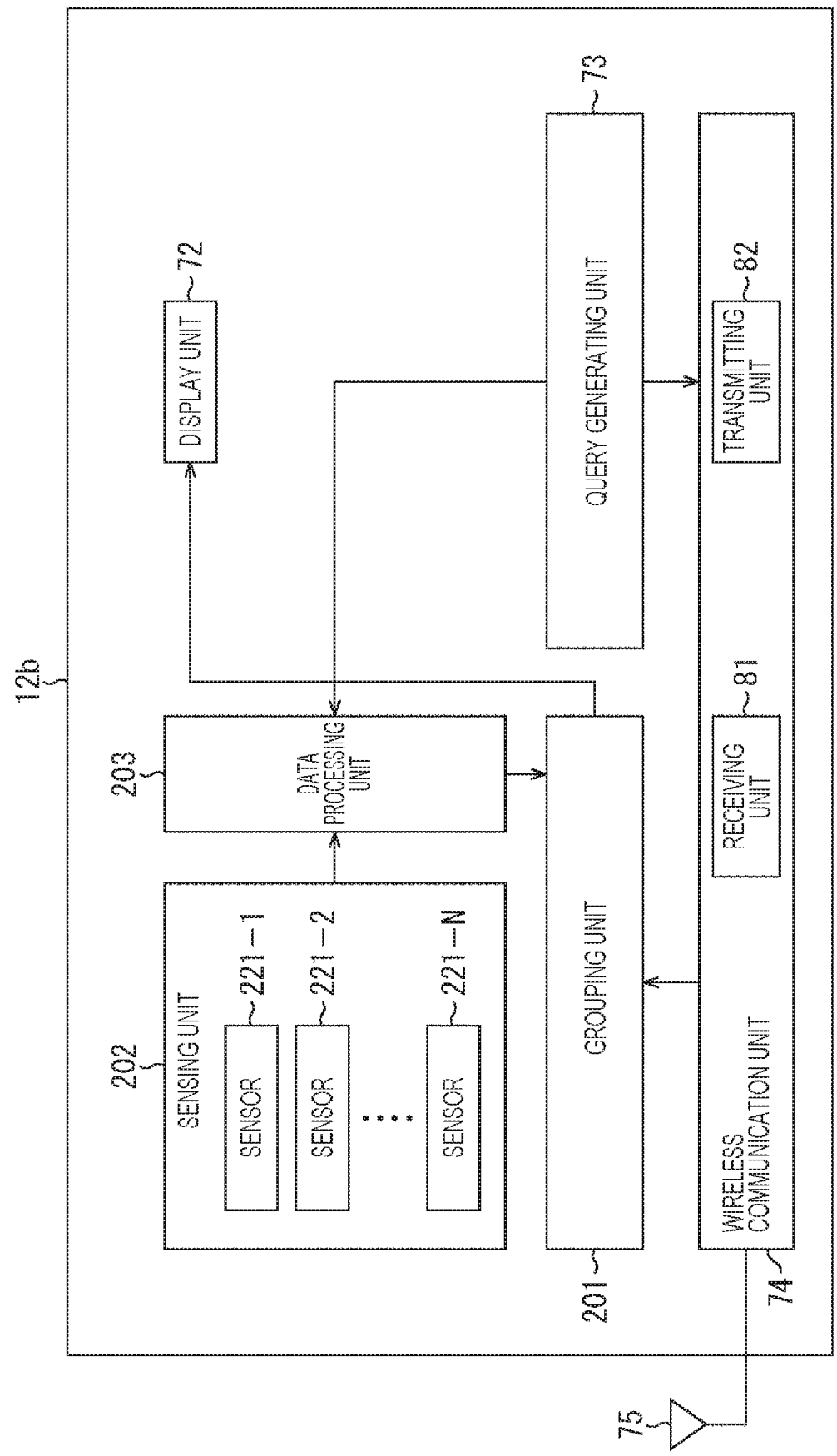
FIG. 9 is a diagram illustrating a configuration example of a setting device according to a second embodiment.

FIG. 9 is a diagram illustrating a configuration example of a setting device 12b according to the second embodiment. Since the setting device 12b illustrated in FIG. 9 has the same configuration as that of the setting device 12 illustrated in FIG. 3 except that a sensing unit 202 and a data processing unit 203 are added to the setting device 12 illustrated in FIG. 3, the same portions will be denoted by the same reference numerals, and a description thereof will be appropriately omitted.

The sensing unit 202 includes a plurality of sensors 221-1 to 221-N, similar to the sensing unit 31 (FIG. 2) of the wireless device 11. The sensors 221-1 to 221-N are, for example, a temperature sensor, an illuminance sensor, and the like.

Data from the sensing unit 202 is supplied to the data processing unit 203. The data processing unit 203 processes time-series data 101 from the sensing unit 202 and generates a processing result 102, similar to the data processing unit 32 (FIG. 2) of the wireless device 11.

That is, the setting device 12b includes the sensing unit 202 and the data processing unit 203 having the same functions as those of the sensing unit 31 and the data processing unit 32 included in the wireless device 11 according to the first embodiment, performs processing similar to the processing performed by the sensing unit 31 and the data processing unit 32 of the wireless device 11.

A grouping unit 201 of the setting device 12b according to the second embodiment performs grouping processing in a similar manner to that of the grouping unit 71 of the setting device 12 according to the first embodiment except that it groups the wireless devices 11 also using the processing result 102 from the data processing unit 203.

The grouping unit 201 also acquires environment information around the setting device 12b itself (acquires a result sensed by the sensing unit 202 of the setting device 12b itself and acquires the processing result 102 regarding the environment information around the setting device 12b itself), groups wireless devices 11 having environment information that coincides with (is similar) to the environment information around the setting device 12b itself into the same group, and sets the wireless devices 11 as wireless devices 11 of a connection symmetry.

According to the setting device 12b according to the second embodiment, it becomes possible to detect and group the wireless devices 11 closer to the setting device 12b than the setting device 12 in the first embodiment.

A configuration of the wireless device 11 according to the second embodiment can be similar to that of the wireless device 11 according to the first embodiment. Therefore, here, the configuration of the wireless device 11 according to the second embodiment is considered as being the same as that of the wireless device 11 according to the first embodiment, and a description thereof will be omitted.

Figure 10:
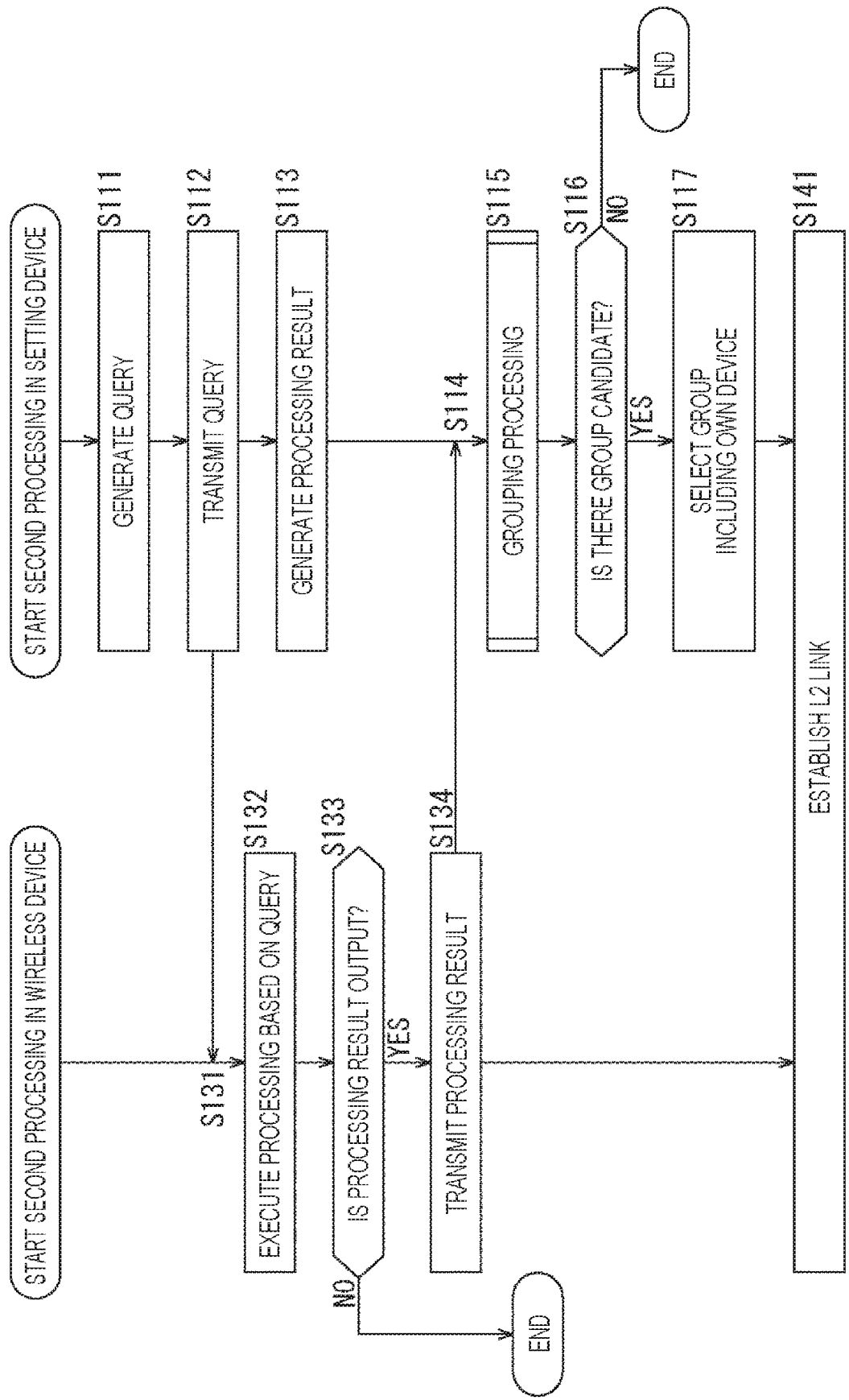
FIG. 10 is a flowchart for describing processing of a system according to a second embodiment.

FIG. 10 is a flowchart for describing processing in each of the wireless device 11 and the setting device 12b. Note that a description for the same processing as that in each of the wireless device 11 and the setting device 12 according to the first embodiment described with reference to the flowchart illustrated in FIG. 5 will be appropriately omitted.

In step S111, the setting device 12 generates a query 121. A query generating unit 73 generates a query 121 for itself and a query 121 for the setting device 12. The query 121 for itself and the query 121 for the setting device 12 are queries having the same contents, and are for causing processing of the environment information acquired by the sensing unit 202 (the sensing unit 31) to be performed.

In step S112, the query 121 generated by the query generating unit 73 is output to the data processing unit 203 and the transmitting unit 82. The transmitting unit 82 transmits the query 121 to the wireless device 11. The processing in steps S111 and S112 is performed basically in a similar manner to that of the processing in steps S11 and S12 (FIG. 5) except that the query for the setting device 12b is generated and supplied to the data processing unit 203.

The data processing unit 203 of the setting device 12b generates the processing result 102 by executing processing based on the query 121 in step S113. This processing is performed by the data processing unit 32 (FIG. 2) of the wireless device 11, for example, in a similar manner to that of the processing executed in step S32 (FIG. 5).

For example, in a case where the data processing unit 203 performs the processing based on the query 121 as described above, the data processing unit 203 extracts time-series data 101-1 for the past 10 minutes designated by the query 121 from time-series data 101-1 obtained from the temperature sensor (here, a description will be continued on the assumption that the sensor 221-1 is the temperature sensor) of the sensing unit 202 designated by the query 121.

Moreover, the data processing unit 203 performs an arithmetic operation designated by the query 121, in this case, an arithmetic operation of calculating an average value of the time-series data 101-1 for the past 10 minutes, and outputs an arithmetic operation result to the grouping unit 201 as the processing result 102.

In the setting device 12b, the environment information (processing result 102) around the setting device 12b itself is also acquired and supplied to the grouping unit 201. Furthermore, the grouping unit 201 performs grouping of the wireless devices 11 using the processing result 102 acquired by the setting device 12b itself. The grouping unit 201 receives a processing result 102 from the wireless device 11, as in the first embodiment.

That is, the wireless device 11 generates the processing result 102 by executing processing of steps S131 to S134 and transmits the processing result 102 to the setting device 12b, and the setting device 12b receives the transmitted processing result 102. The processing executed by the wireless device 11 in steps S131 to S134 is similar to the processing executed in steps S31 to S34 (FIG. 5), and a description thereof will thus be omitted here.

In step S114, a receiving unit 81 of the setting device 12b receives the processing result 102 from the wireless device 11. The received processing result 102 is supplied to the grouping unit 201.

The grouping unit 201 performs grouping processing in step S115. The grouping processing in step S115 is performed in a similar manner to that of the grouping processing executed in step S14 (FIG. 5) (specifically, the processing based on the flowchart illustrated in FIG. 8). However, the grouping processing executed by the grouping unit 201 in step S115 is different from the grouping processing executed in step S14 in that it is performed using the processing result 102 from the wireless device 11 and the processing result 102 from the data processing unit 203 (the processing result 102 generated by the setting device 12b itself).

Therefore, a group generated by the processing by the grouping unit 201 includes a group including the setting device 12b.

In step S116, it is determined whether or not there is a group candidate. This determination can be made in a similar manner to that of step S15 (FIG. 5). In a case where it is determined in step S116 that there is a group candidate, the processing proceeds to step S117.

In step S117, a group including an own device is selected. That is, since the grouping unit 201 performs the grouping also using the processing result 102 of the setting device 12b as described above, the group including the own device, in this case, the setting device 12b is generated, and the group including the setting device 12b is thus selected.

Thereafter, if necessary, in step S141, an L2 link is established between the setting device 12b and the wireless devices 11 included in the selected group.

As such, the group including the setting device 12b can be generated and selected. Therefore, it becomes possible to perform detection of the wireless device 11 with higher accuracy. A phrase "with higher accuracy" means that, for example, in the second embodiment, the wireless device 11 that is near the setting device 12b, in other words, in the same environment as that of the setting device 12b, is detected and selected as a connection destination candidate, and it is thus possible to perform detection narrowed-down as compared with the first embodiment.

Referring to FIG. 1 again, for example, the wireless devices 11-1 to 11-3 in the room A are grouped into the same group A, and the wireless devices 11-4 and 11-5 in the room B are grouped into the same group B. In both of the first embodiment and the second embodiment, the grouping is performed using the processing result 102 of the wireless device 11 (the environment information around the wireless device 11), and it thus becomes possible to perform such grouping.

In the first embodiment, an example in which it is identified by the set number T which of the group A and the group B is a group desired as a connection destination by the user has been shown. For example, referring to the flowchart of the grouping processing of FIG. 8 again, in step S57, processing of determining whether or not there is a class C that coincides with the number T is included, and in this processing, the class C that matches the set number T is selected. In this case, the set number T is used to determine which of the group A and the group B is the group desired as the connection destination by a user.

In a case where the numbers of wireless devices 11 included respectively in the group A and the group B are the same as each other (set number T), there is a possibility that the group A and the group B will be presented as device groups of the wireless devices 11 of the connection destination to the user.

In the second embodiment, in such a case, when the setting device 12b is in the room A, the setting device 12b is also included in the group A including the wireless devices 11-1 to 11-3 in the same environment as that of the setting device 12b, and the group A is thus presented as a device group of the wireless devices 11 of the connection destination to the user.

As described above, in the second embodiment, the wireless device 11 that the user is to desire as the connection destination can be detected with higher accuracy, selected, and presented to the user.

<Third Processing in Each Device>

Next, a third embodiment will be described.

In the third embodiment, as in the second embodiment, a setting device 12 acquires environment information around the setting device itself, and performs grouping of wireless devices 11 using the acquired environment information.

Moreover, in the third embodiment, when the setting device 12 acquires the environment information around the setting device itself, the setting device 12 generates a real world event such as outputting a sound or emitting light, and allows the wireless devices 11 that have sensed the real world event to be grouped and presented to a user.

Figure 11:
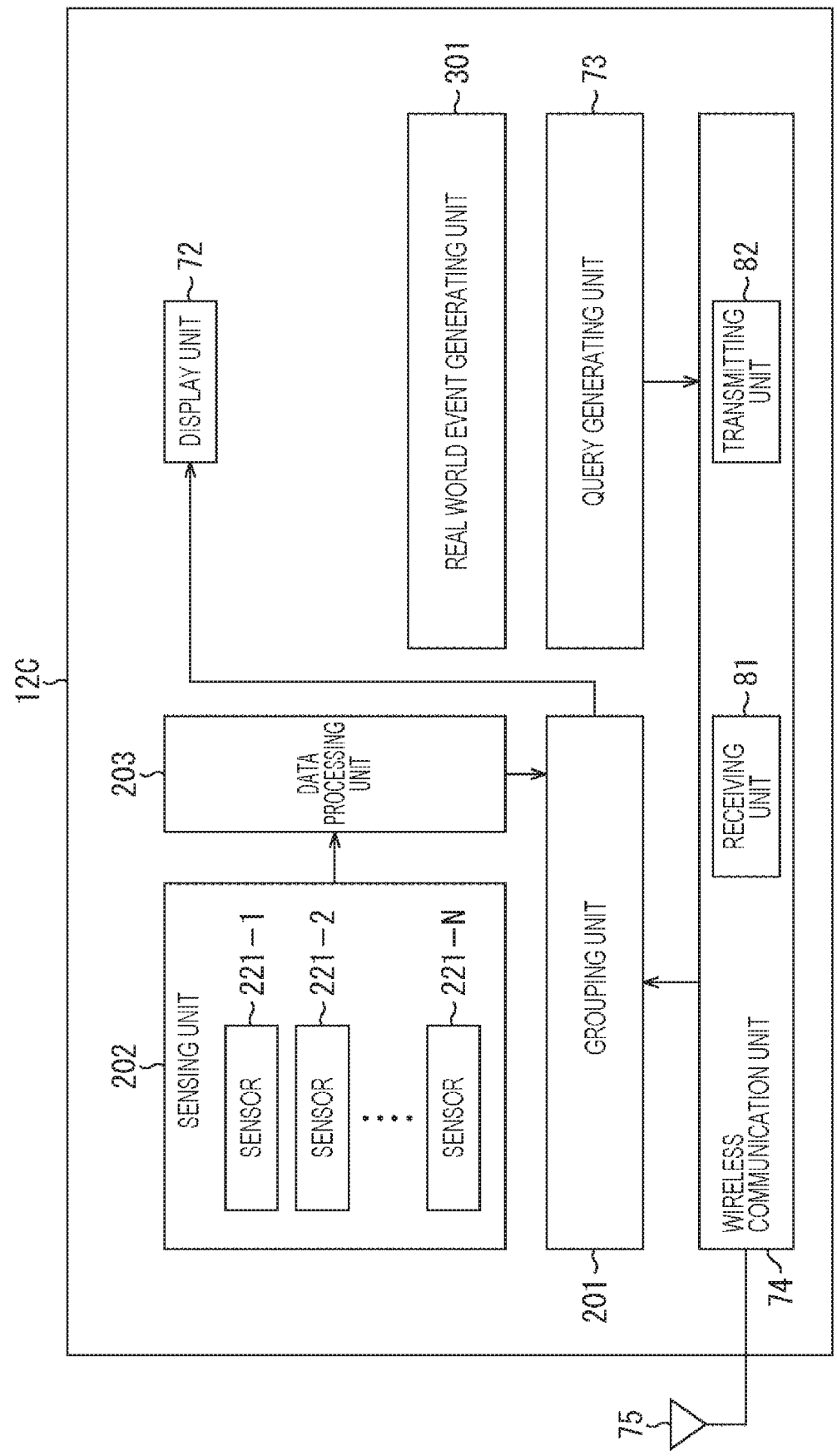
FIG. 11 is a diagram illustrating a configuration example of a setting device according to a third embodiment.

In order to generate the real world event, the setting device 12 has a configuration as illustrated in FIG. 11. Note that the real world event is to generate a physical phenomenon such as light, a sound, or a vibration.

FIG. 11 is a diagram illustrating a configuration example of a setting device 12c according to the third embodiment. Since the setting device 12c illustrated in FIG. 11 has the same configuration as that of the setting device 12b illustrated in FIG. 9 except that a real world event generating unit 301 is added to the setting device 12b illustrated in FIG. 9, the same portions will be denoted by the same reference numerals, and a description thereof will be appropriately omitted.

The real world event generating unit 301 generates the real world event. An example of the real world event generated by the real world event generating unit 301 includes generation of a sound, emission of light, or the like, and the real world event generating unit 301 has a function for generating the real world event.

For example, the real world event generating unit 301 includes a speaker, a light, and the like. Furthermore, the real world event generating unit 301 may be a configuration including a vibrator, and a sound or a vibration generated by operating the vibrator may be used as the real world event.

Note that, for example, in a case where the setting device 12c is a smartphone, the real world event generating unit 301 can use a function included in the smartphone. For example, since the smartphone includes a speaker that emits a reception sound when a call is received, a sound as the real world event may thus be output from the speaker.

Furthermore, since the smartphone has a display, the real-world event of light may be generated by causing the display to emit the light. Furthermore, since the vibrator is also provided in the smartphone as described above, the vibration may be used to generate the real world event.

The real world event generating unit 301 is only required to have a function of generating an event that can be sensed by the sensor 41 provided as the sensing unit 31 in the wireless device 11.

In the third embodiment, the wireless devices 11 that have acquired the real world event generated by the setting device 12c as the environment information can be grouped into the same group and be presented as candidates for a connection destination to the user.

A configuration of the wireless device 11 according to the third embodiment can be similar to that of the wireless device 11 according to the first embodiment. Therefore, here, the configuration of the wireless device 11 according to the third embodiment is considered as being the same as that of the wireless device 11 according to the first embodiment, and a description thereof will be omitted.

Figure 12:
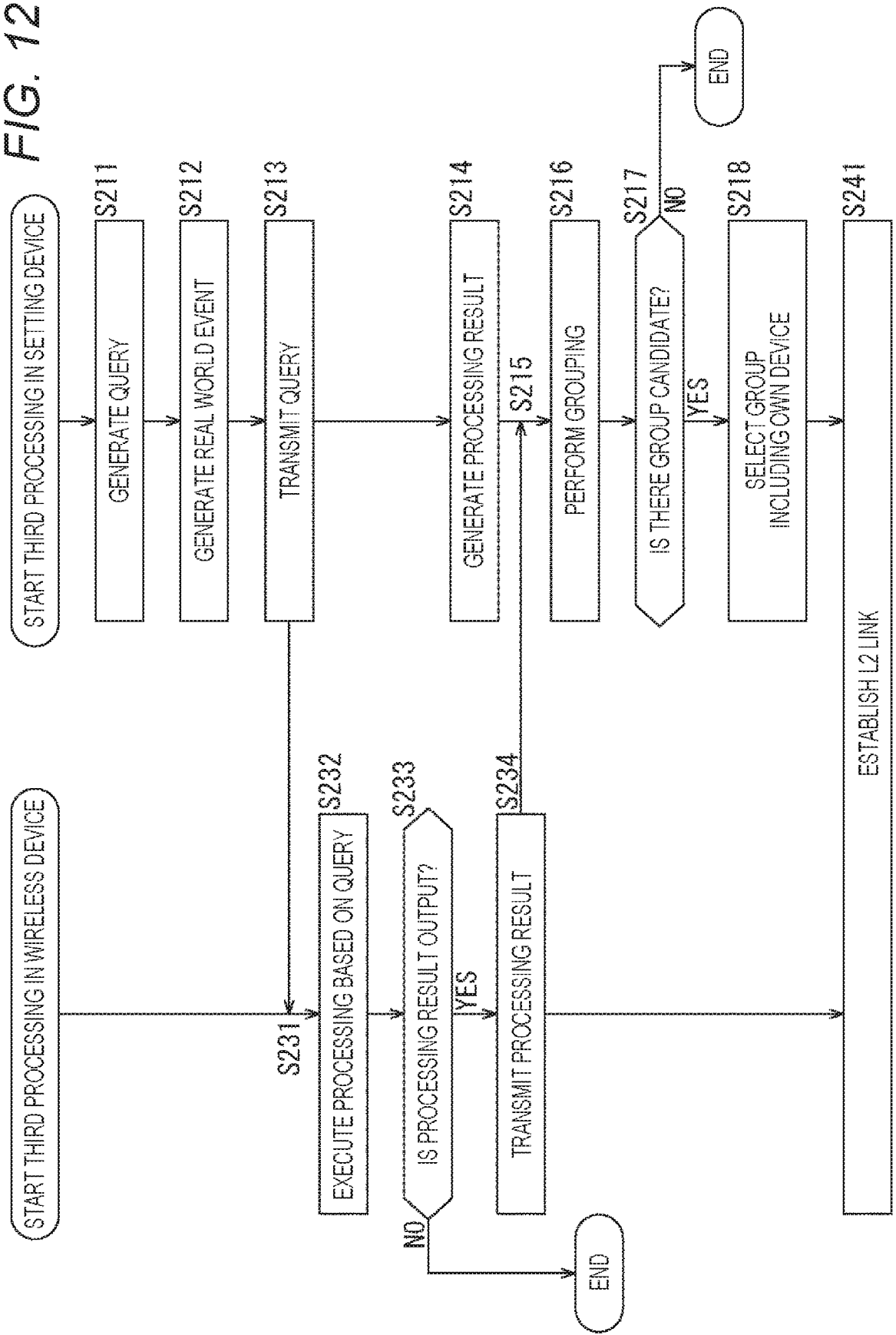
FIG. 12 is a flowchart for describing processing of a system according to a third embodiment.

FIG. 12 is a flowchart for describing processing in each of the wireless device 11 and the setting device 12c. Note that a description for the same processing as the processing in each of the wireless device 11 and the setting device 12 according to the first embodiment described with reference to the flowchart illustrated in FIG. 5 or the processing in each of the wireless device 11 and the setting device 12b according to the second embodiment described with reference to the flowchart illustrated in FIG. 10 will be appropriately omitted.

In step S211, the setting device 12 generates a query 121. A query generating unit 73 generates a query 121 for itself and a query 121 for the setting device 12, as in the second embodiment.

In step S212, the real world event generating unit 301 generates the real world event. In step S213, the generated query 121 is transmitted to the wireless device 11.

The order of processing in steps S211 to S213 can be changed. For example, the query 121 may be generated and transmitted after the real world event has been generated or the real world event may be generated after the query 121 is transmitted.

When the real world event is generated in the setting device 12c, the real world event is also detected by the wireless device 11 that is in the same environment near the setting device 12c.

That is, the wireless device 11 generates a processing result 102 by executing processing of steps S231 to S234 and transmits the processing result 102 to the setting device 12c, and the setting device 12c receives the transmitted processing result 102.

The processing executed by the wireless device 11 in steps S231 to S234 is similar to the processing executed in steps S31 to S34 (FIG. 5), and a description thereof will thus be omitted here.

Since the processing result 102 from the wireless device 11 that has detected the real world event is data obtained by processing time-series data 101 when the wireless device 11 has detected the real world event, a processing result 102 from the wireless device 11 that has not detected the real world event can be obviously different data.

The setting device 12c also acquires the environment information (processing result 102) around the setting device 12c itself and supplies the acquired environment information to a grouping unit 201. Furthermore, the grouping unit 201 performs grouping of the wireless devices 11 using the processing result 102 acquired by the setting device 12b itself. The grouping unit 201 receives a processing result 102 from the wireless device 11, as in the first embodiment.

In step S215, a receiving unit 81 of the setting device 12c receives the processing result 102 from the wireless device 11. The received processing result 102 is supplied to the grouping unit 201.

The grouping unit 201 performs grouping processing in step S216. The grouping processing in step S216 is performed in a similar manner to that of the grouping processing executed in step S114 (FIG. 10). Therefore, a group generated by the processing by the grouping unit 201 includes a group including the setting device 12c.

Furthermore, since the wireless devices 11 that have detected the real world event as well as the setting device 12c are grouped into the same group, for example, in a case where the real world event is generation of a sound, only the wireless devices 11 that have collected the generated sound are grouped into the same group.

In this case, by changing a volume of the sound, for example, in a case where a small sound is generated, only the wireless devices 11 located near the setting device 12c can be detected. Furthermore, for example, in a case where a loud sound is generated, even the wireless device 11 located at a position distant from the setting device 12c can be detected. As such, a range in which the wireless devices 11 are detected can be narrowed down according to strength of the sound.

Furthermore, in a case where light is emitted as the real world event, similar to a case of the sound, a range of the wireless devices 11 to be detected can be changed between when dark light is emitted and when bright light is emitted.

In step S217, it is determined whether or not there is a group candidate. This determination can be made in a similar manner to that of step S15 (FIG. 5). In a case where it is determined in step S217 that there is a group candidate, the processing proceeds to step S218.

In step S218, a group including an own device is selected. That is, since the grouping unit 201 performs the grouping also using the processing result 102 of the setting device 12c as described above, the group including the own device, in this case, the setting device 12c is generated, and the group including the setting device 12c is thus selected.

Thereafter, if necessary, in step S241, an L2 link is established between the setting device 12c and the wireless devices 11 included in the selected group.

As such, a group which is the group including the setting device 12c and includes the wireless device 11 that has detected the real world event can be generated and selected. Therefore, it becomes possible to perform detection of the wireless device 11 with higher accuracy. A phrase "with higher accuracy" means that, for example, in the third embodiment, the wireless device 11 in a range in which the real world event generated by the setting device 12c can be sensed is detected and selected as a connection destination candidate, and it is thus possible to perform detection narrowed-down as compared with the first embodiment.

Referring to FIG. 1 again, according to the first embodiment or the second embodiment, for example, the wireless devices 11-1 to 11-3 in the room A are grouped into the same group A, and the wireless devices 11-4 and 11-5 in the room B are grouped into the same group B.

According to the third embodiment, for example, in a case where the setting device 12c is near the wireless device 11-1 and the wireless device 11-2 and the wireless device 11-3 are installed at positions farther from the setting device 12c than the wireless device 11-1 is, a group A1 including the wireless device 11-1, a group A2 including the wireless device 11-2 and the wireless device 11-3, and a group C including the wireless device 11-4 and the wireless device 11-5 are generated, and the group A1 is presented to the user.

Furthermore, as another example, in a case where the room A and the room B are in the same environment, for example, in a case where the light is turned on in the room A and the room B and temperatures of the room A and the room B are the same as each other, in the second embodiment, there is a possibility that the wireless devices 11-1 to 11-5 in the room A and the room B will be grouped into the same group A, such that an erroneous result will be obtained.

Even in a case where a change in the environment is small as such, according to the third embodiment, the setting device 12c itself can produce a change in the environment by generating the real world event and detect and group the wireless devices 11 that have grasped the change in the environment, and can thus prevent an erroneous result from being obtained.

According to the present embodiment, it becomes possible to perform such grouping.

As described above, in the third embodiment, the wireless device 11 that the user is to desire as the connection destination can be detected with higher accuracy, selected, and presented to the user.

Note that, as the third embodiment, the configuration in which the real world event generating unit 301 is added to the setting device 12b according to the second embodiment, as illustrated in FIG. 11, has been described by way of example, but a configuration in which the real world event generating unit 301 is added to the setting device 12 according to the first embodiment illustrated in FIG. 3 may be a configuration of the setting device 12c according to the third embodiment.

As described above, in the third embodiment, the wireless devices 11 that have detected the real world event generated by the setting device 12c can be grouped into the same group. Therefore, even though the setting device 12c itself does not have a configuration in which it detects the real world event, in other words, even though the setting device 12c itself has a configuration in which it does not acquire environment information of an environment around the setting device 12c itself, it is possible to separate the wireless device 11 that has detected the real world event generated by the setting device 12c from the wireless device 11 that has not detected the real world event.

Then, for example, a group in which a change in the environment is large (a value of the processing result 102 is large, or the like) can be determined to be the wireless device 11 near the setting device 12c and be presented to the user.

As such, the setting device 12c having the configuration in which the real world event generating unit 301 is added to the setting device 12 according to the first embodiment may be used as the setting device 12c according to the third embodiment to execute the processing described above.

According to the present technology, it becomes possible to transmit the query describing the method of processing the time-series data, using the frame that can be transmitted to the wireless device 11 in a point in time before the wireless device 11 and the setting device 12 establish a link such as, for example, the Layer 2 link and the like.

Furthermore, it becomes possible to transmit the processing result obtained by processing the time-series data, using the frame that can be transmitted to the setting device 12 in the point in time before the wireless device 11 and the setting device 12 establish the link such as, for example, the Layer 2 link and the like.

Moreover, it becomes possible to establish the link such as, for example, the Layer 2 link and the like between the wireless device 11 and the setting device 12 by transmitting and receiving the query or the processing result between the wireless device 11 and the setting device 12 in the point in time before the wireless device 11 and the setting device 12 establish the link such as, for example, the Layer 2 link and the like.

When such a link such as the Layer 2 link and the like is established, it becomes possible to appropriately select the wireless device 11 that the user desires from the plurality of wireless devices 11.

<With Respect to Recording Medium>

The series of processing described above can be executed by hardware or can be executed by software. In a case where the series of processing is executed by the software, programs configuring the software are installed in a computer. Here, the computer includes a computer incorporated in dedicated hardware, or, for example, a general-purpose personal computer that can execute various functions by installing various programs, or the like.

Figure 13:
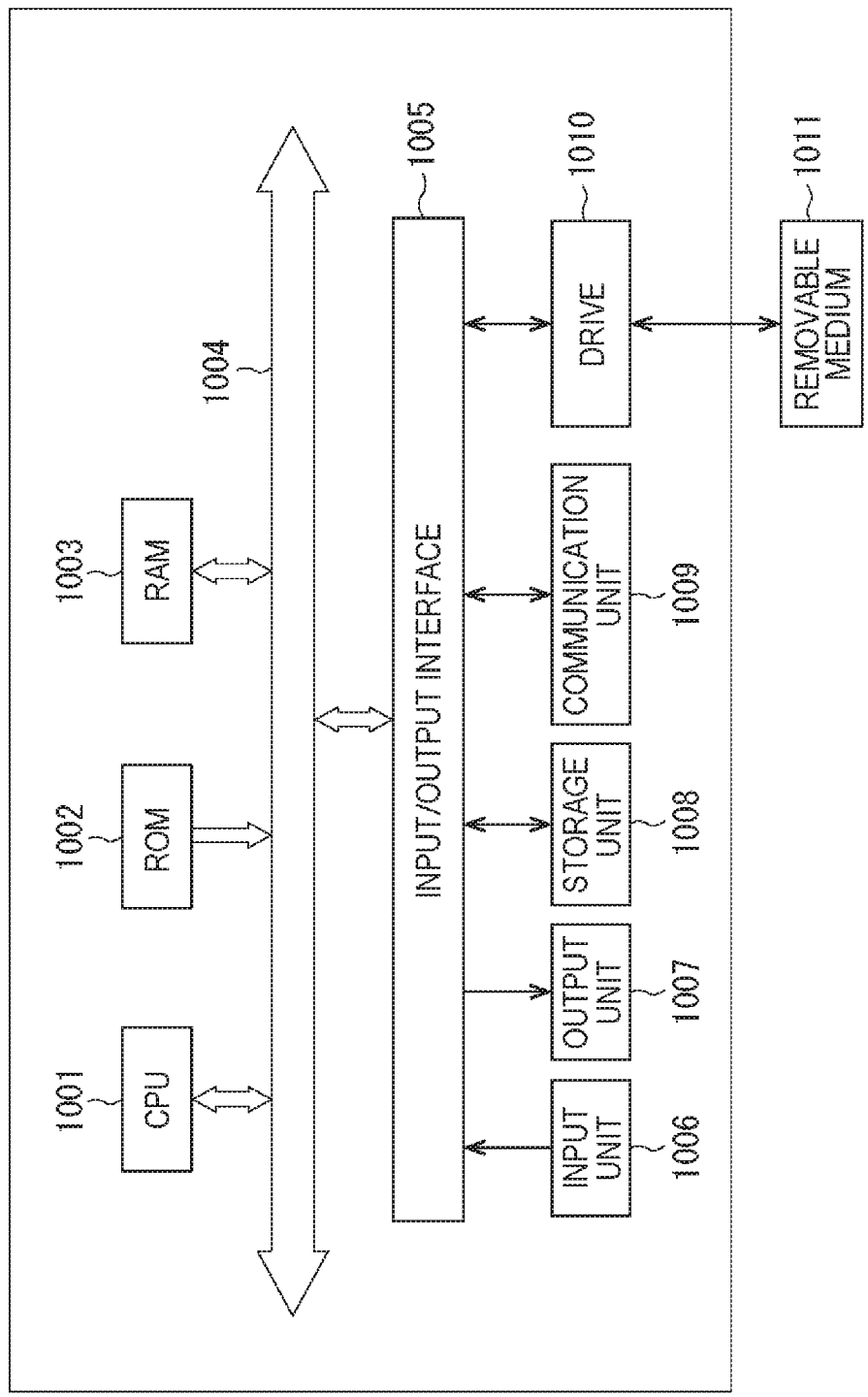
FIG. 13 is a diagram for describing a recording medium.

FIG. 13 is a block diagram illustrating a configuration example of hardware of a computer that executes the series of processing described above by a program. In the computer, a central processing unit (CPU) 1001, a read only memory (ROM) 1002, and a random access memory (RAM) 1003 are connected to each other by a bus 1004. An input/output interface 1005 is further connected to the bus 1004. An input unit 1006, an output unit 1007, a storage unit 1008, a communication unit 1009, and a drive 1010 are connected to the input/output interface 1005.

The input unit 1006 includes a keyboard, a mouse, a microphone, and the like. The output unit 1007 includes a display, a speaker, and the like. The storage unit 1008 includes a hard disk, a nonvolatile memory, or the like. The communication unit 1009 includes a network interface and the like. The drive 1010 drives a removable medium 1011 such as a magnetic disk, an optical disk, a magneto-optical disk, a semiconductor memory, or the like.

In the computer configured as described above, the CPU 1001 performs the series of processing described above by loading, for example, a program stored in the storage unit 1008 into the RAM 1003 via the input/output interface 1005 and the bus 1004 and executing the program.

The program executed by the computer (CPU 1001) can be provided by being recorded on the removable medium 1011 as, for example, a package medium and the like. Furthermore, the program can be provided via a wired or wireless transmission medium such as a local area network, the Internet, or digital satellite broadcasting.

In the computer, the program can be installed in the storage unit 1008 via the input/output interface 1005 by mounting the removable medium 1011 on the drive 1010. Furthermore, the program can be received by the communication unit 1009 via the wired or wireless transmission medium and be installed in the storage unit 1008. In addition, the program can be installed in the ROM 1002 or the storage unit 1008 in advance.

Note that the program executed by the computer may be a program by which processing is performed in time series according to the order described in the present specification or may be a program by which processing is performed in parallel or at a necessary timing such as a timing when a call is made, or the like.

Furthermore, in the present specification, a system refers to an entire device including a plurality of devices.

Note that effects described in the present specification are merely examples and are not limited, and other effects may be provided.

Note that the embodiments of the present technology are not limited to the embodiments described above, and various modifications can be made without departing from the scope of the present technology.

Note that the present technology can also have the following configuration.

(1)

An information processing device including:

a generating unit that generates a query;

a transmitting unit that transmits the query generated by the generating unit to each of other information processing devices by wireless communication;

a receiving unit that receives processing results based on the query from the other information processing devices by wireless communication; and a grouping unit that groups the other information processing devices using the processing results received by the receiving unit, (1)

in which the information processing device establishes a Layer 2 link with the other information processing devices grouped by the grouping unit.

(2)

The information processing device according to the above (1), in which the query includes at least a command to process time-series data obtained by a sensing unit included in each of the other information processing devices.

(3)

The information processing device according to the above (1) or (2), in which the query includes at least information designating mathematical processing to be executed for the time-series data.

(4)

The information processing device according to any one of the above (1) to (3), in which the query and the processing result are transmitted and received using a public action frame of IEEE 802.11.

(5)

The information processing device according to any one of the above (1) to (4), further including:

a sensing unit that acquires environment information by a sensor and generates time-series data; and a processing unit that processes the time-series data on the basis of the query generated by the generating unit, in which the grouping unit groups the other information processing devices using a processing result processed by the processing unit.

(6)

The information processing device according to the above (5), in which the information processing device establishes the Layer 2 link with the other information processing devices included in a group including the information processing device itself among groups generated by the grouping unit.

(7)

The information processing device according to any one of the above (1) to (6), further including an event generating unit that generates a physical event, in which the event generating unit generates the event before or after the query is transmitted.

(8)

The information processing device according to the above (7), in which the event generates at least one of a sound, light, or a vibration.

(9)

The information processing device according to any one of the above (1) to (8), in which a grouping result according to a similarity between time-series data from the other information processing devices in a group generated by the grouping unit is displayed.

(10)

An information processing method performed by an information processing device, including:

performing generation processing of generating a query;

performing transmission processing of transmitting the query generated by the generating processing to each of other information processing devices by wireless communication;

performing reception processing of receiving processing results based on the query from the other information processing devices by wireless communication; and performing grouping processing of grouping the other information processing devices using the processing results received by the reception processing, in which the information processing device establishes a Layer 2 link with the other information processing devices grouped by the grouping processing.

(11)

A program for causing a computer to function as:

a generating unit that generates a query;

a transmitting unit that transmits the query generated by the generating unit to each of other information processing devices by wireless communication;

a receiving unit that receives processing results based on the query from the other information processing devices by wireless communication; and a grouping unit that groups the other information processing devices using the processing results received by the receiving unit, in which the program includes processing of establishing a Layer 2 link between an information processing device and the other information processing devices grouped by the grouping unit.

(12)

An information processing device including:

a sensing unit that acquires environment information by a sensor and generates time-series data;

a receiving unit that receives a query from another information processing device by wireless communication;

a processing unit that processes the time-series data on the basis of the query received by the receiving unit; and a transmitting unit that transmits a processing result processed by the processing unit to the another information processing device by wireless communication.

(13)

The information processing device according to the above (12), in which the query includes at least a command to process the time-series data.

(14)

The information processing device according to the above (12) or (13), in which the query includes information designating mathematical processing to be executed for the time-series data, and the processing unit performs the mathematical processing designated by the query.

(15)

The information processing device according to any one of the above (12) to (14), in which the query and the processing result are transmitted and received using a public action frame of IEEE 802.11.

(16)

The information processing device according to any one of the above (12) to (15), in which after the processing result is transmitted by the transmitting unit, a Layer 2 link between the information processing device and the another information processing device is established.

(17)

An information processing method performed by an information processing device, including:

performing sensing processing of acquiring environment information by a sensor and generating time-series data;

performing reception processing of receiving a query from another information processing device by wireless communication;

processing the time-series data on the basis of the query received by the reception processing; and performing transmission processing of transmitting a processed processing result to the another information processing device by wireless communication.

(18)

A program for causing a computer to function as:

a sensing unit that acquires environment information by a sensor and generates time-series data;

a receiving unit that receives a query from another information processing device by wireless communication;

a processing unit that processes the time-series data on the basis of the query received by the receiving unit; and a transmitting unit that transmits a processing result processed by the processing unit to the another information processing device by wireless communication.

(19)

An information processing system including a first information processing device and a second information processing device that perform wireless communication, in which the first information processing device includes:

a generating unit that generates a query;

a first transmitting unit that transmits the query to the second information processing device;

a first receiving unit that receives a processing result based on the query from the second information processing device; and a grouping unit that groups the second information processing device using the processing result, and the second information processing device includes:

a sensing unit that acquires environment information by a sensor and generates time-series data;

a second receiving unit that receives the query from the first information processing device;

a processing unit that processes the time-series data on the basis of the query received by the second receiving unit; and a second transmitting unit that transmits a processing result processed by the processing unit to the first information processing device, and the first information processing device establishes a Layer 2 link with the second information processing device grouped by the grouping unit.

REFERENCE SIGNS LIST

11 Wireless device
12 Setting device
31 Sensing unit
32 Data processing unit
33 Wireless communication unit
41 Sensor
51 Receiving unit
52 Transmitting unit
71 Grouping unit
72 Display unit
73 Query generating unit
74 Wireless communication unit
81 Receiving unit
82 Transmitting unit
101 Time-series data
102 Processing result
121 Query
141 Device group
201 Grouping unit
202 Sensing unit
203 Data processing unit
221 Sensor
301 Real world event generating unit

The invention claimed is:

1. A first information processing device, comprising:
circuitry configured to:
generate a query;
transmit the query to each of a plurality of second information processing devices by wireless communication, wherein
each second information processing device of the plurality of second information processing devices is different from the first information processing device,
the query includes information of a method to process time-series data, and
the time-series data is associated with each second information processing device of the plurality of second information processing devices;
receive processing results of the time-series data, from the plurality of second information processing devices by the wireless communication, based on the transmitted query;
group the plurality of second information processing devices into a plurality of groups based on the received processing results of the time-series data;
determine a first number of second information processing devices in a first group of the plurality of groups is one of greater than a specific number set by a user input from a user of the first information processing device, or equal to the specific number;
select the first group from the plurality of groups based on the determination that the first number of second information processing devices in the first group is equal to the specific number;
extract, from the first group of the plurality of groups, a second group including a second number of second information processing devices based on the determination that the first number of second information processing devices in the first group is greater than the specific number,
wherein the second number of second information processing devices in the extracted second group is equal to the specific number; and
establish a Layer 2 link with one of the selected first group including the first number of second information processing devices or the extracted second group including the second number of second information processing devices.

2. The first information processing device according to claim 1, wherein the query further includes information associated with mathematical processing to be executed for the time-series data.

3. The first information processing device according to claim 1, wherein the circuitry is further configured to:
transmit the query based on a public action frame of IEEE 802.11; and
receive the processing results based on the public action frame of IEEE 802.11.

4. The first information processing device according to claim 1, wherein the circuitry is further configured to:
acquire environment information;
generate the time-series data based on the environment information; and
process the time-series data based on the query.

5. The first information processing device according to claim 1, wherein the circuitry is further configured to generate a physical event based on the transmitted query.

6. The first information processing device according to claim 5, wherein the physical event corresponds to at least one of a physical phenomenon of sound, a physical phenomenon of light, or a physical phenomenon of vibration.

7. The first information processing device according to claim 1, wherein the circuitry is further configured to:
generate a grouping result based on a similarity between the time-series data of the plurality of second information processing devices; and
display the grouping result.

8. An information processing method, comprising:
in a first information processing device:
generating a query;
transmitting the query to each of a plurality of second information processing devices by wireless communication, wherein
each second information processing device of the plurality of second information processing devices is different from the first information processing device,
the query includes information of a method to process time-series data, and
the time-series data is associated with each second information processing device of the plurality of second information processing devices;
receiving processing results of the time-series data, from the plurality of second information processing devices by the wireless communication, based on the transmitted query;
grouping the plurality of second information processing devices into a plurality of groups based on the received processing results of the time-series data;
determining a first number of second information processing devices in a first group of the plurality of groups is one of greater than a specific number set by a user input from a user of the first information processing device, or equal to the specific number;
selecting the first group from the plurality of groups based on the determination that the first number of second information processing devices in the first group is equal to the specific number,
extracting, from the first group of the plurality of groups, a second group including a second number of second information processing devices based on the determination that the first number of second information processing devices in the first group is greater than the specific number,
wherein the second number of second information processing devices in the extracted second group is equal to the specific number; and
establishing a Layer 2 link with one of the selected first group including the first number of second information processing devices or the extracted second group including the second number of second information processing devices.

9. A non-transitory computer-readable medium having stored thereon computer-executable instructions which, when executed by a first information processing device, cause the first information processing device to execute operations, the operations comprising:
generating a query;
transmitting the query to each of a plurality of second information processing devices by wireless communication, wherein
each second information processing device of the plurality of second information processing devices is different from the first information processing device,
the query includes information of a method to process time-series data, and
the time-series data is associated with each second information processing device of the plurality of second information processing devices;
receiving processing results of the time-series data, from the plurality of second information processing devices by the wireless communication, based on the transmitted query;
grouping the plurality of second information processing devices into a plurality of groups based on the received processing results of the time-series data;
determining a first number of second information processing devices in a first group of the plurality of groups is one of greater than a specific number set by a user input from a user of the first information processing device, or equal to the specific number;
selecting the first group from the plurality of groups based on the determination that the first number of second information processing devices in the first group is equal to the specific number;
extracting, from the first group of the plurality of groups, a second group including a second number of second information processing devices based on the determination that the first number of second information processing devices in the first group is greater than the specific number,
wherein the second number of second information processing devices in the extracted second group is equal to the specific number; and
establishing a Layer 2 link with one of the selected first group including the first number of second information processing devices or the extracted second group including the second number of second information processing devices.

10. A first information processing device, comprising:
circuitry configured to: acquire environment information;
generate time-series data based on the acquired environment information;
receive a query from a second information processing device by wireless communication, wherein the query includes information of a method to process the time-series data;
process the time-series data based on the information of the method in the received query;
transmit a processing result of the processed time-series data to the second information processing device by the wireless communication; and
establish a Layer 2 link between the first information processing device and the second information processing device where the first information processing device is part of a first group in a case where the first group has a first number of first information processing devices that has transmitted processing results and the first number is equal to a specific number set by a user input from a user of the second information processing device, and is part of a second group extracted from the first group in a case where the first number of first information processing devices in the first group is greater than the specific number,
wherein the second group includes a second number of first information processing devices that is equal to the specific number, and the processing results includes the processing result.

11. The first information processing device according to claim 10, wherein the query further includes information associated with mathematical processing to be executed for the time-series data, and the circuitry is further configured to perform the mathematical processing designated by the query.

12. The first information processing device according to claim 10, wherein the circuitry is further configured to:
receive the query based on a public action frame of IEEE 802.11; and
transmit the processing result based on the public action frame of IEEE 802.11.

13. An information processing method, comprising:
in a first information processing device:
acquiring environment information;
generating time-series data based on the acquired environment information;
receiving a query from a second information processing device by wireless communication, wherein the query includes information of a method to process the time-series data;
processing the time-series data based on the information of the method in the received query;
transmitting a processing result of the processed time-series data to the second information processing device by the wireless communication; and
establishing a Layer 2 link between the first information processing device and the second information processing device where the first information processing device is part of a first group in a case where the first group has a first number of first information processing devices that has transmitted processing results and the first number is equal to a specific number set by a user input from a user of the second information processing device, and is part of a second group extracted from the first group in a case where the first number of first information processing devices in the first group is greater than the specific number,
wherein the second group includes a second number of first information processing devices that is equal to the specific number, and the processing results includes the processing result.

14. A non-transitory computer-readable medium having stored thereon computer-executable instructions which, when executed by a first information processing device, cause the first information processing device to execute operations, the operations comprising:
acquiring environment information;
generating time-series data based on the acquired environment information; receiving a query from a second information processing device by wireless communication, wherein the query includes information of a method to process the time-series data;
processing the time-series data based on the information of the method in the received query;
transmitting a processing result of the processed time-series data to the second information processing device by the wireless communication; and
establishing a Layer 2 link between the first information processing device and the second information processing device where the first information processing device is part of a first group in a case where the first group has a first number of first information processing devices that has transmitted processing results and the first number is equal to a specific number set by a user input from a user of the second information processing device, and is part of a second group extracted from the first group in a case where the first number of first information processing devices in the first group is greater than the specific number,
wherein the second group includes a second number of first information processing devices that is equal to the specific number, and the processing results includes the processing result.

15. An information processing system, comprising:
a first information processing device; and
a second information processing device configured to perform wireless communication, wherein
the first information processing device includes first circuitry configured to:
generate a query;
transmit the query to the second information processing device, wherein
the query includes information of a method to process time-series data, and
the time-series data is associated with the second information processing device;
receive a processing result of the time-series data, from the second information processing device, based on the transmitted query;
group the second information processing device into one of a plurality of groups based on the received processing result of the time-series data;
determine a first number of second information processing devices in a first group of the plurality of groups is one of greater than a specific number set by a user input from a user of the first information processing device, or equal to the specific number;
select the first group from the plurality of groups based on the determination that the first number of second information processing devices in the first group is equal to the specific number;
extract, from the first group of the plurality of groups, a second group including a second number of second information processing devices based on the determination that the first number of second information processing devices in the first group is greater than the specific number,
the second number of second information processing devices in the extracted second group is equal to the specific number,
the second information processing device includes second circuitry configured to:
acquire environment information;
generate the time-series data based on the environment information;
receive the query from the first information processing device;
process the time-series data based on the information of the method in the received query; and
transmit the processing result of the processed time-series data to the first information processing device, and
the first circuitry is further configured to establish a Layer 2 link with one of the selected first group including the first number of second information processing devices or the extracted second group including the second number of second information processing devices.

* * * * *